Nov. 6, 1962  C. L. STANCLIFF ET AL  3,062,614
LIQUID-COOLED INTERNAL COMBUSTION ENGINE WITH
MEANS FOR RELIEVING THERMAL STRESS
Filed Oct. 5, 1959  13 Sheets-Sheet 1

INVENTORS
CLIFTON L. STANCLIFF
GERALD N. STANCLIFF
BY Lilly & Nyhagen
ATTORNEYS

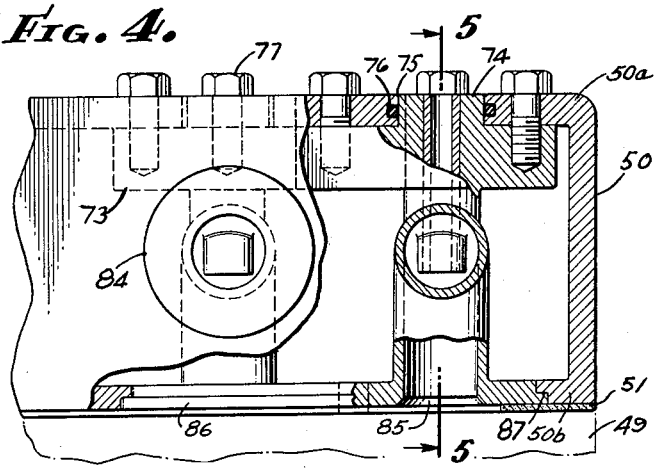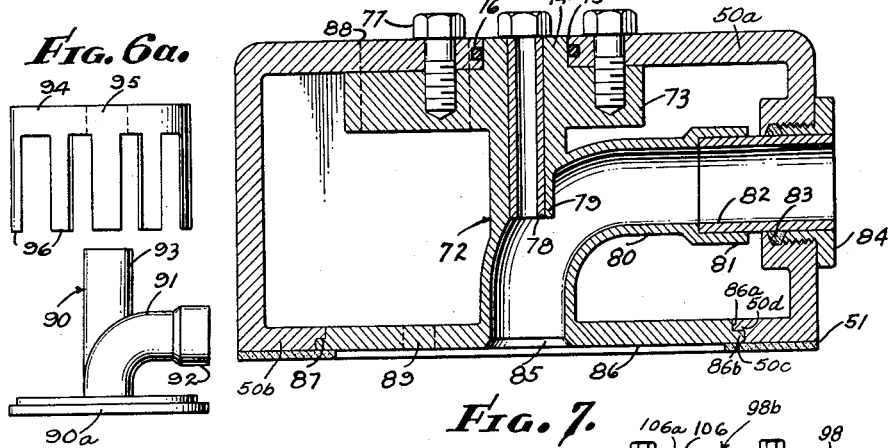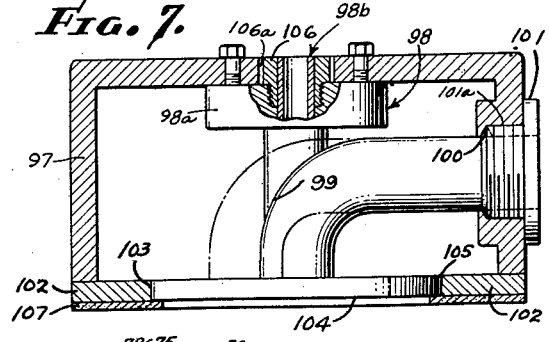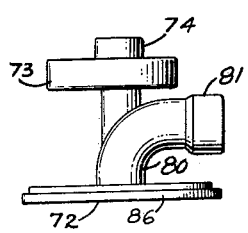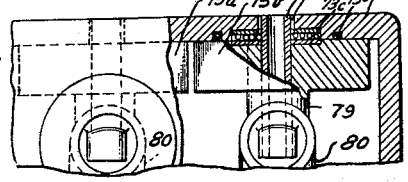
INVENTORS
CLIFTON L. STANCLIFF
GERALD N. STANCLIFF

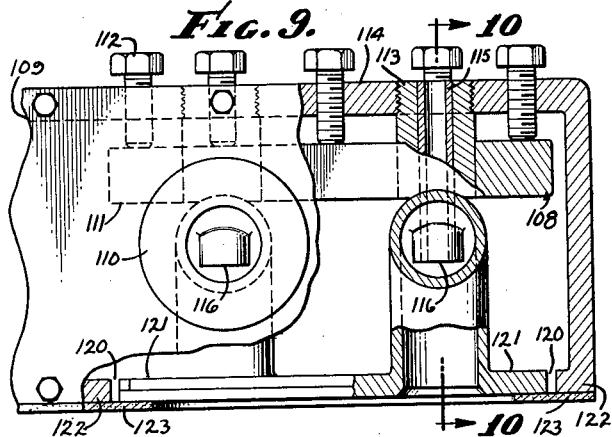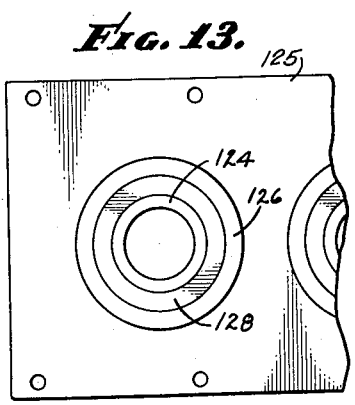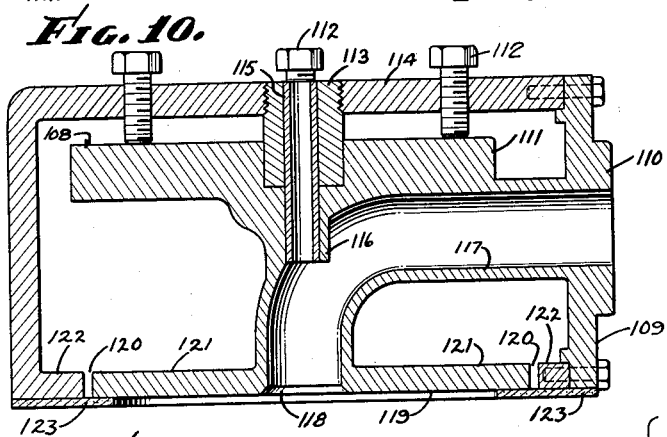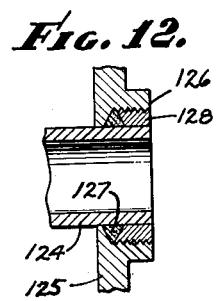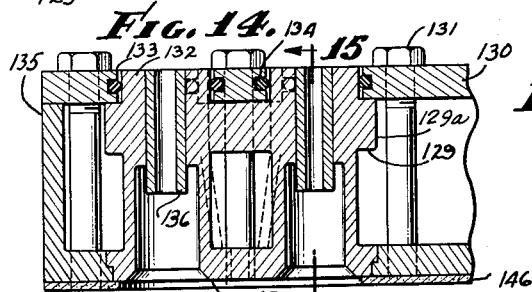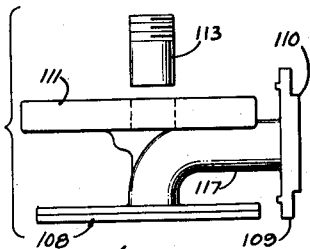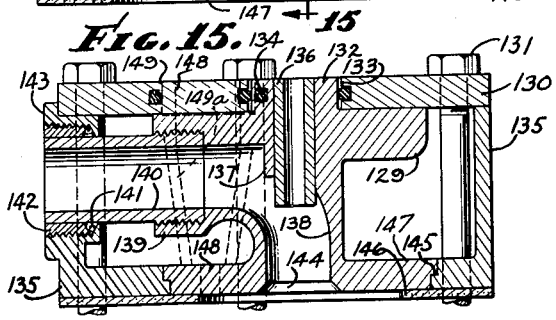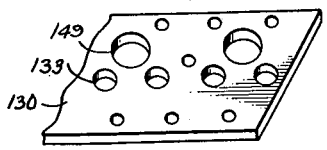

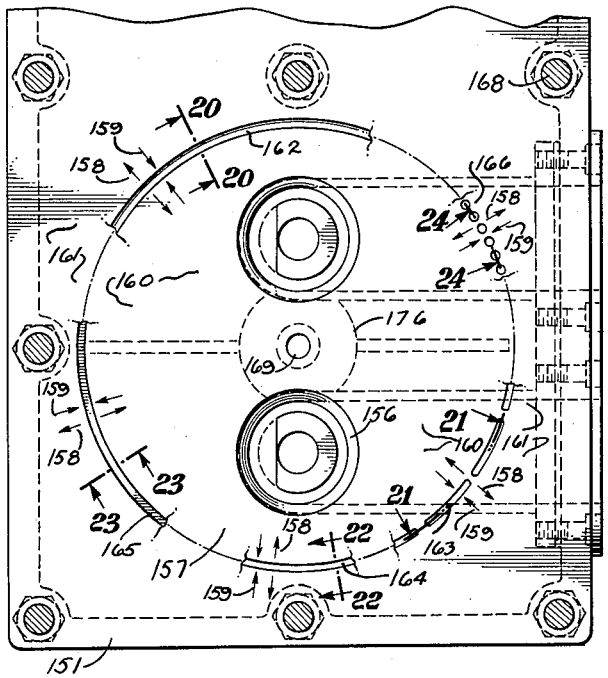

Nov. 6, 1962  C. L. STANCLIFF ET AL  3,062,614
LIQUID-COOLED INTERNAL COMBUSTION ENGINE WITH
MEANS FOR RELIEVING THERMAL STRESS
Filed Oct. 5, 1959  13 Sheets-Sheet 5

INVENTORS
CLIFTON L. STANCLIFF
GERALD N. STANCLIFF
BY
Lilly & Nyhagen
ATTORNEYS

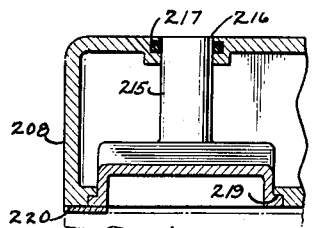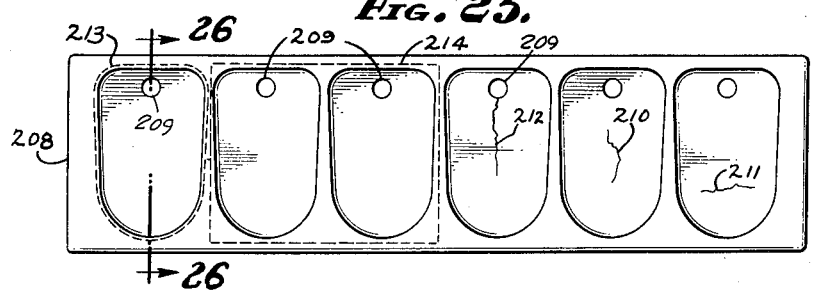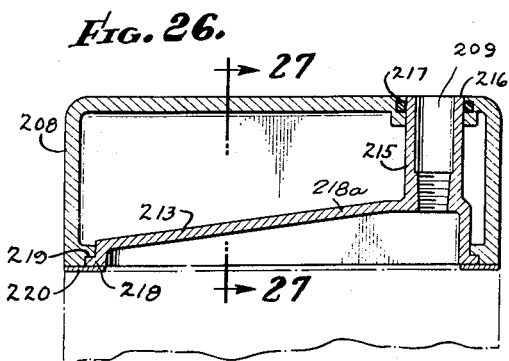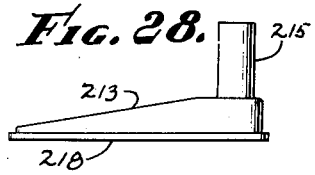

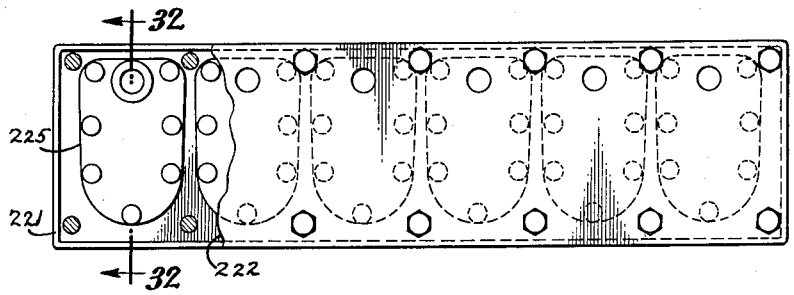
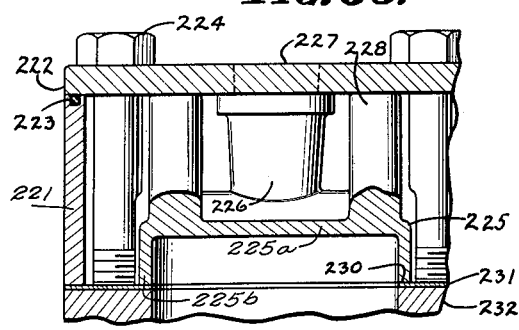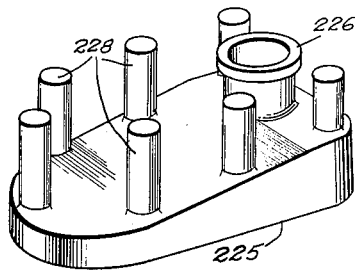
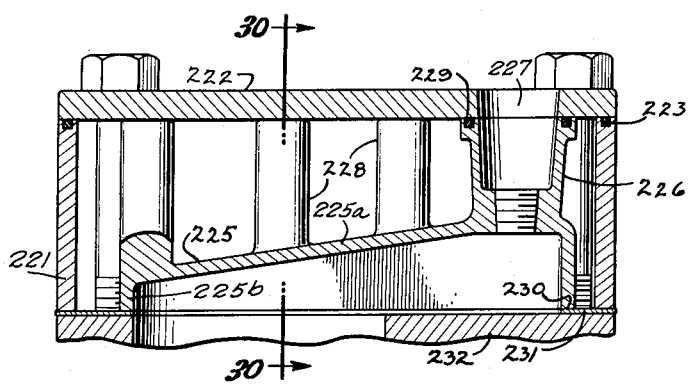

Nov. 6, 1962  C. L. STANCLIFF ET AL  3,062,614
LIQUID-COOLED INTERNAL COMBUSTION ENGINE WITH
MEANS FOR RELIEVING THERMAL STRESS
Filed Oct. 5, 1959  13 Sheets-Sheet 8
FIG. 33.
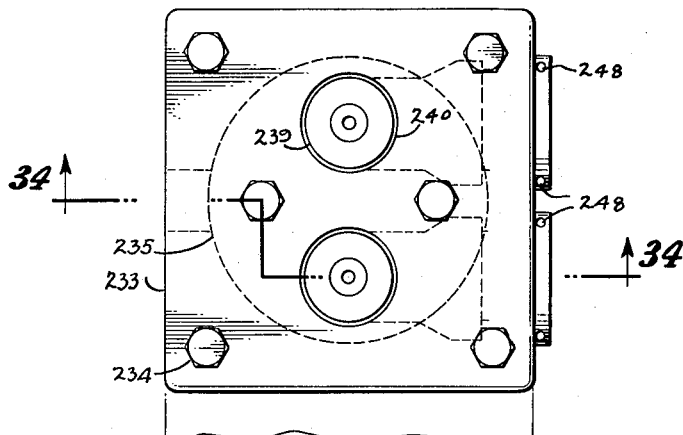
FIG. 34.  FIG. 36.  FIG. 37.
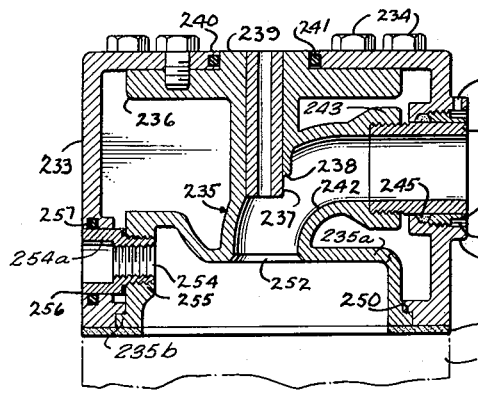
FIG. 35.
FIG. 38.
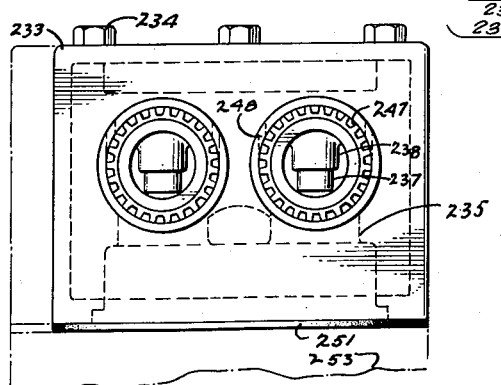
INVENTORS
CLIFTON L. STANCLIFF
GERALD N. STANCLIFF
BY
Lilly & Nyhagen
ATTORNEYS

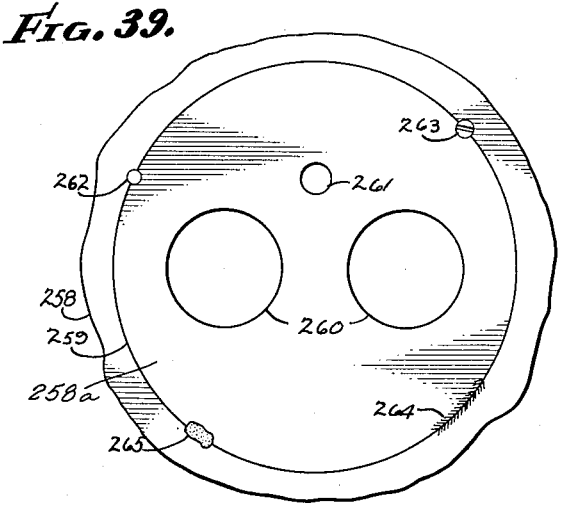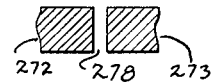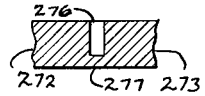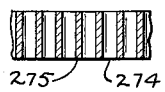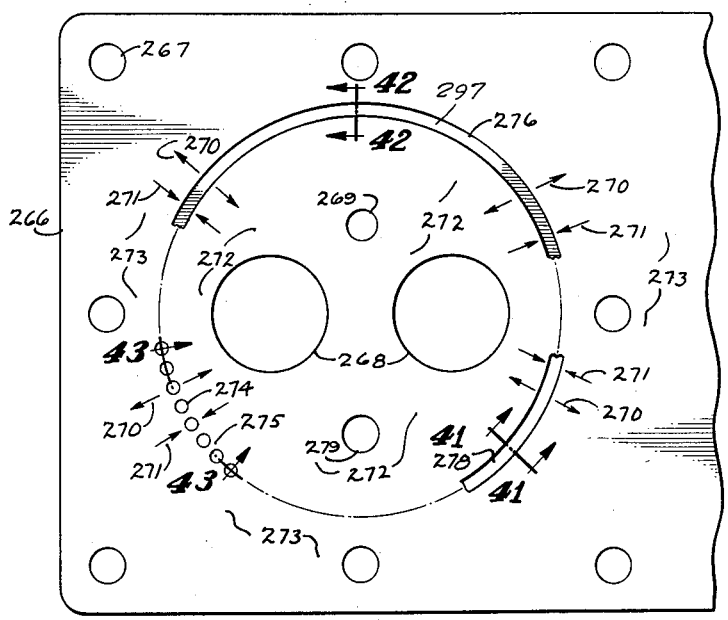

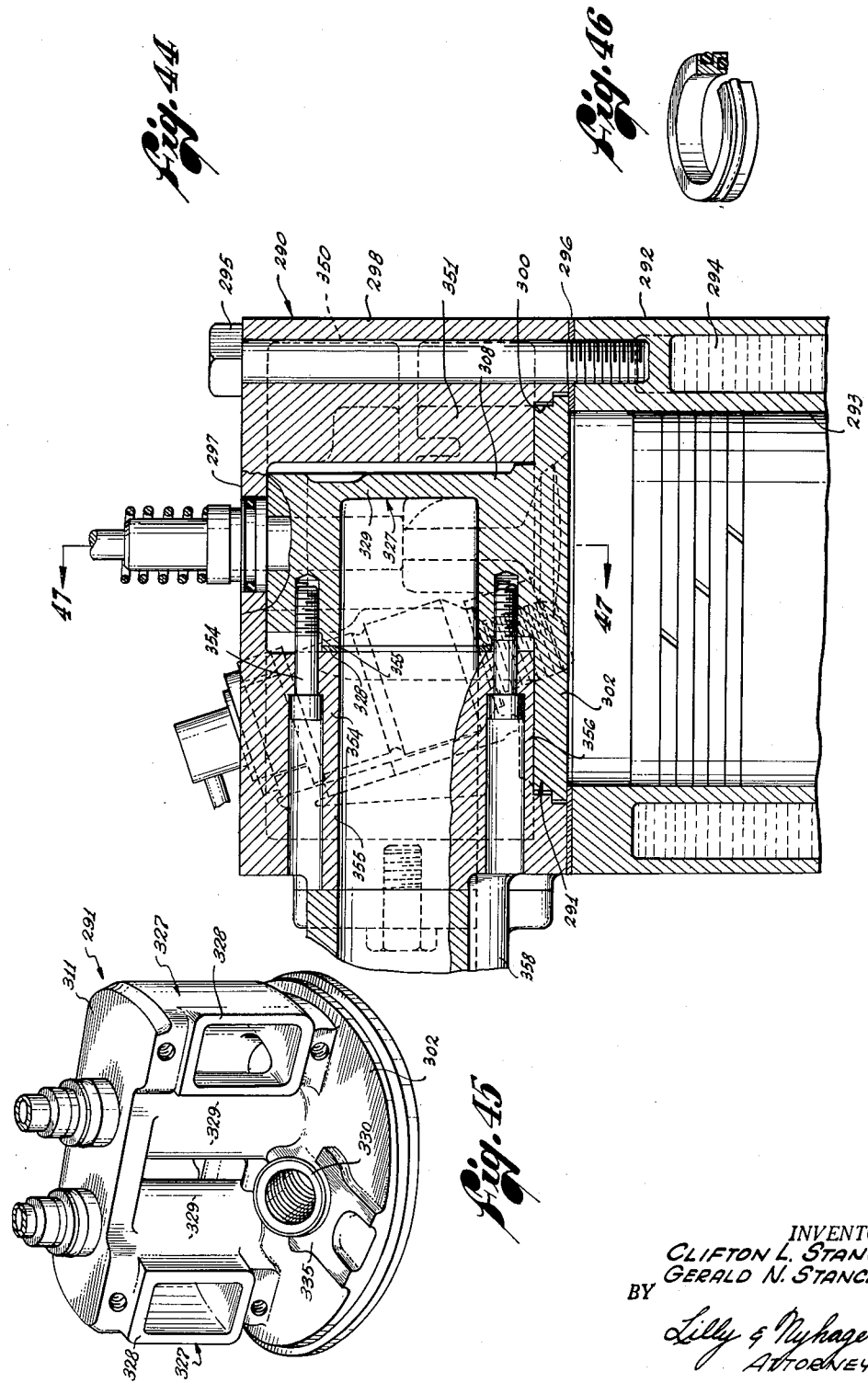

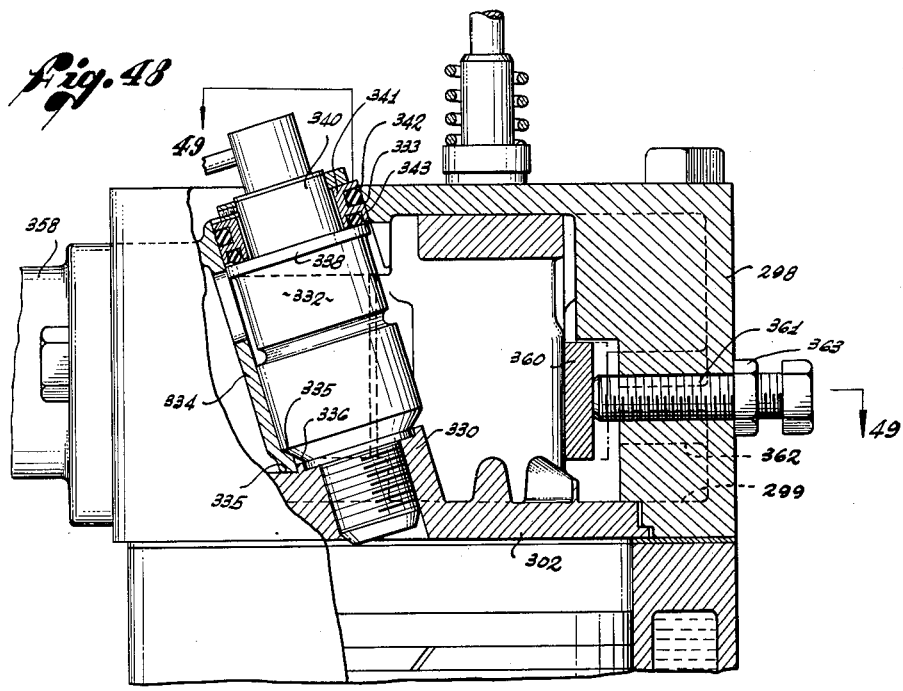
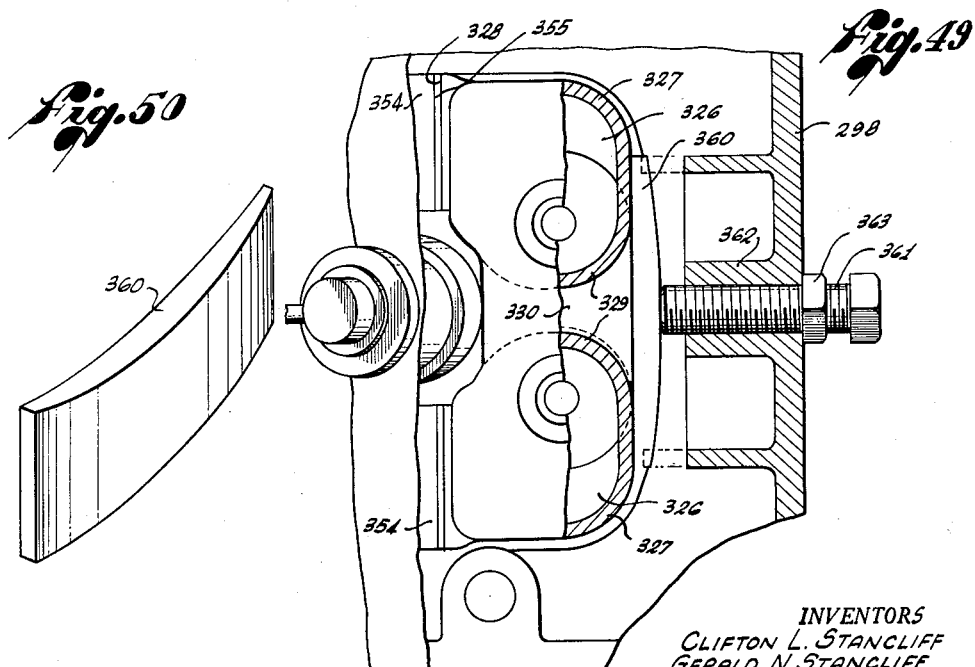

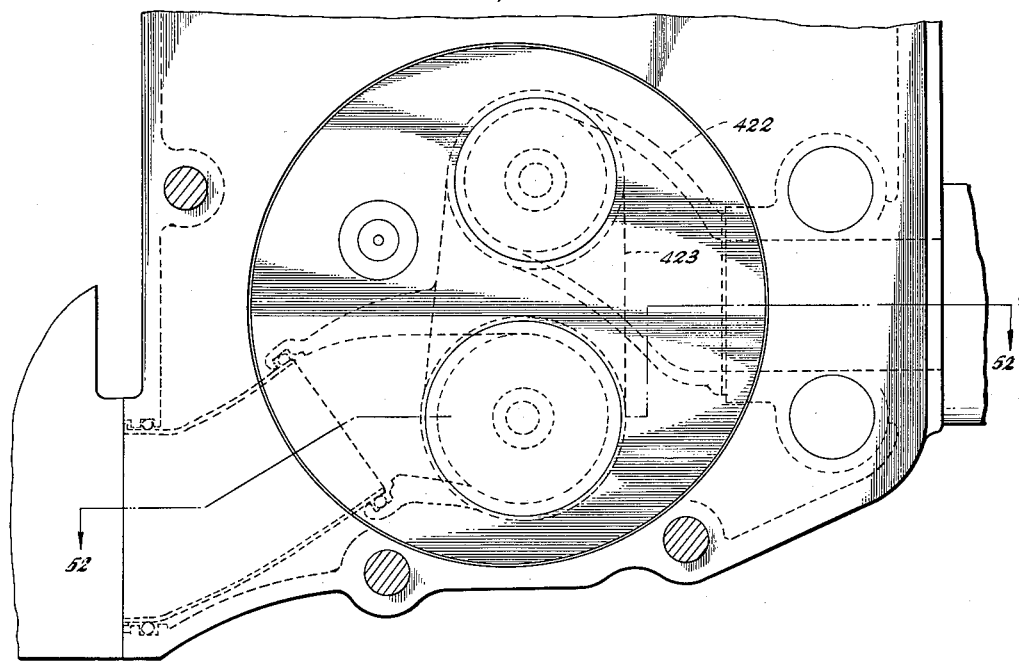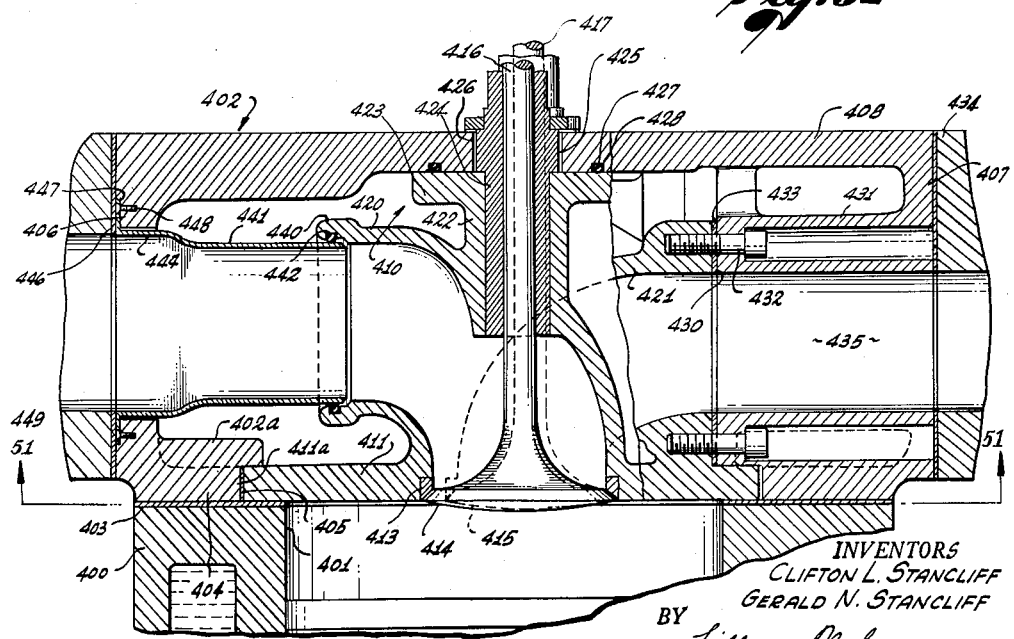

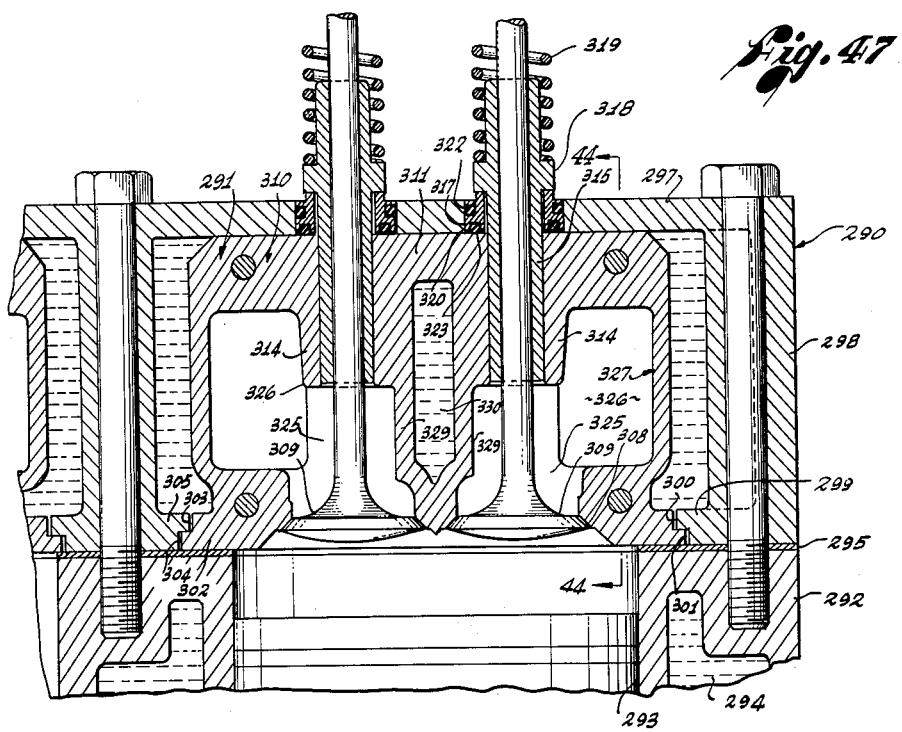
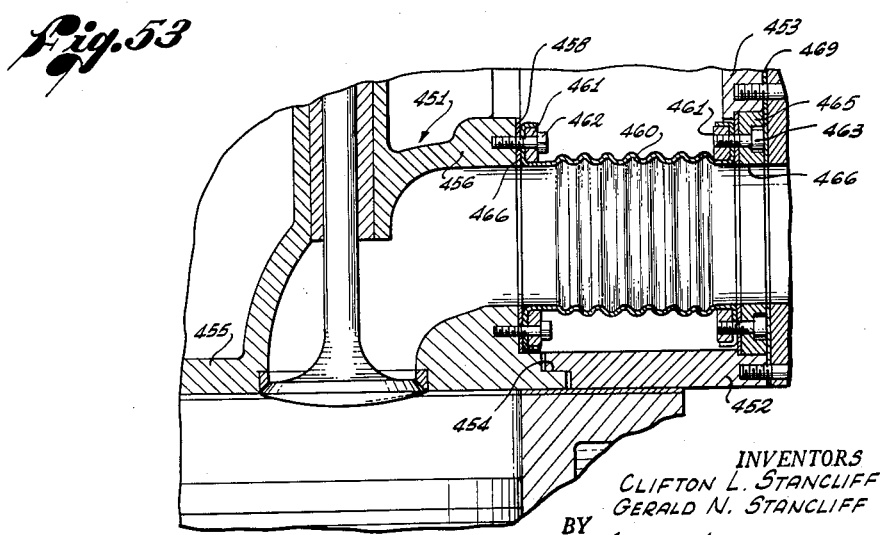

3,062,614
LIQUID-COOLED INTERNAL COMBUSTION ENGINE WITH MEANS FOR RELIEVING THERMAL STRESS
Clifton L. Stancliff and Gerald N. Stancliff, Bakersfield, Calif.; said Gerald N. Stancliff assignor to said Clifton L. Stancliff
Filed Oct. 5, 1959, Ser. No. 844,367
30 Claims. (Cl. 123—41.01)

This invention relates generally to liquid-cooled internal combustion engines and, particularly, to improvements in such engines directed to the solution of various problems arising from thermal distortions and damage in service. Illustrative problems contemplated by the present invention include warping and cracking of the cylinder head or block, poor valve seating under heated and thermally distorted running conditions, burning of valve seats and necessity for frequent valve grinding, incomplete fuel combustion, and loss of fuel efficiency and horsepower.

The present application is a continuation-in-part of our copending application Serial No. 645,096, filed March 11, 1957, now Patent No. 2,944,336, issued July 12, 1960, which was a continuation of our parent application Serial No. 520,550, filed July 7, 1955, now abandoned.

In our application Serial No. 645,096, we disclose and claim a process for repairing a thermally damaged liquid-cooled engine of conventional type. The present application is directed to and claims the novel engine structure resulting from the repair process. The same novel reconstructed structure is also suitable for new engines, and the present application, accordingly, discloses and claims novel engine structures, whether these structures result from the said repair process, or constitute new engine equipment. Since the novel engine structures of the invention were initially developed for repair purposes, they will be most conveniently disclosed herein after in that connection, but it will be understood that new engine structures as well as repaired engines are broadly contemplated.

The cylinder heads and blocks of present day internal combustion engines are subject to severe damage as a consequence of their high operating temperatures. Temperature gradients cause compressive and tension stresses in the combustion chamber walls, and lead to cracking, buckling and warping, distortion of valve seats, and of the cylinder head and the cylinder block. In those prior cylinder head castings, wherein the inner fire-contacted combustion chamber area is integral with cooler operating metal outside the combustion chamber area, there is a severe conflict between the tendency for substantial thermal expansion of the highly heated fire-contacted area, and the much lower expansion of the metal outside the combustion chamber area. Severe compressive stresses are set up by the radial expansion of the fire-contacted area, resisted by the cooler portion of the casting outside the combustion chamber. The highly heated combustion chamber wall, under this compression, crushes into itself, so to speak, developing tremendous stresses and strains. This condition is responsible for the commonly observed warping and cracking of cylinder heads.

We have also discovered that prior valve-in-head engines suffer from valve seats in the combustion chamber head wall being distorted from round to oval shape as a result of radial thermal expansion forces in the highly heated head wall, resisted by colder metal outside the combustion chamber, resulting in poor seating of valves, loss of compression, fuel efficiency and power, incomplete combustion, and burning of the valves and seats. We have discovered that the usual frequency of valve grinding is directly attributable to this cause.

An object of the present invention is the provision of novel engine structures which may be utilized in the repair of thermally damaged engines, or in new engines to relieve certain thermal stresses which lead to engine damage.

A further object is to provide an improved internal combustion engine wherein highly heated and stressed combustion chamber wall portions are separated or isolated from surrounding cooler running portions of the engine walls, thereby eliminating the cause of the warping and cracking normally resulting from immobility or lack of freedom of adjacent portions of the casting to stretch, expand, contract and move free from binding and constriction during alternating and continuous periods of exposure to heat and cold.

A further object is accordingly the provision of a cylinder head structure in which the valve seats do not warp to an oval shape during operation as a result of thermal expansion.

A still further object is the provision of a cylinder head structure having valve seats therein and wherein provision is made for improving the seating of the valves, and characterized further by improved compression, fuel efficiency and power, and more complete fuel combustion.

Typical application of the invention to the case of the repair of a thermally damaged diesel engine cylinder head wall, with the damage being found in the combustion head wall over the cylinder bore, is as follows: A portion of the original combustion chamber head wall is milled out or otherwise excised throughout an area encompassing and overlapping somewhat, i.e., extending outside, the combustion chamber area. In a diesel engine, this combustion chamber area is approximately the area of the cylinder bore, and the excised area accordingly is somewhat larger than the cylinder bore area. A replacement or insert unit is then fabricated, including a replacement head wall, which is shaped to fit into the aperture made in the original head wall. This replacement head wall is not, however, integrally joined to the remaining part of the original head wall, but merely mechanically fitted therein, and it is a preferred and important feature of the invention that this replacement head wall be so mechanically fitted as to afford a degree of unrestrained radial thermal expansion when the engine is heated. That is to say, there is provided, in effect, an expansion joint between the replacement head wall and the opposed edge of the remaining portion of the original head wall such as a gap, slidingly overlapped flanges, or a frangible region, such that, upon thermal expansion of the highly heated replacement head wall, it will not forcibly engage the aperture defining edge of the cooler running outside or original head wall, which is more remote from the combustion flame. Thus, compressive strains ordinarily set up in the head wall under heated running conditions are relieved or prevented. The strains in an ordinary cylinder head wall actually occur in a complex pattern, owing to differential heating and temperature gradients extending in various directions. The described isolation of the replacement head wall from the remaining portion of the original or surrounding head wall prevents thermally induced strain transmission across the joint therebetween, and thereby relieves the strains in each. There is thus removed a primary cause of the fractures, warpage and buckling that necessitated the repair job, so that the engine is not subject to recurrence of the same type of damage. In this connection, in view of the damage prevention character of the replacement unit, such a unit may also be used in new engines, and thus becomes an original insert unit rather than a replacement.

The construction as thus described results in freedom for thermal expansion of the flame-contacted insert wall in all radial directions, with the result that roundness of the valve seats is preserved notwithstanding thermal expansion, and valves continue to seat properly under heated running conditions.

Between the replacement head wall and the top surface of the cylinder wall, around the cylinder wall, is placed a sealing gasket, which is effective to hold engine compression. This gasket may also extend under the joint or gap between the replacement head wall and the remainder of the original head wall.

The replacement or insert unit is also equipped with means by which it is held down in position against explosion pressure, and may include also centering means cooperating with the cylinder head, new port tubes, which coact with the original cylinder head, and new valve seats and valve guide support structure, it being understood that the original valve seats and valve guide support structure, as well as port tubes, are cut away along with the removed portion of the cylinder head wall with which said parts were integral.

Various additional objects and advantages, as well as the broad and specific nature of the invention itself, will appear and be described in the course of the following detailed description of a number of illustrative embodiments of the invention, reference for this purpose being had to the accompanying drawings, in which: FIGURE 1 is a plan view of a high compression valve-in-head cylinder head taken on the line 1—1 of FIGURE 2, showing in dashed lines the areas of the cylinder head wall to be cut away in accordance with the invention;

FIGURE 4 is a section taken on broken line 4—4 of FIGURE 3;

FIGURE 5 is a transverse section taken on line 5—5 of FIGURE 4;

FIGURE 6 is an elevational view of the replacement unit of FIGURES 2–6;

FIGURE 6a shows a modified form of replacement unit;

FIGURE 7 is a transverse view through a cylinder head showing an alternative form of the invention;

FIGURE 8 is a fragmentary view showing a modification of FIGURE 4;

FIGURE 9 is a side elevational view, with parts broken away to show underlying parts in section, of another embodiment of the invention;

FIGURE 10 is a section on line 10—10 of FIGURE 9;

FIGURE 11 is a view showing the replacement unit of FIGURES 9 and 10;

FIGURE 12 is a sectional view of a modification of a portion of FIGURE 11;

FIGURE 13 is a side elevational view of the cylinder head side wall of FIGURE 12;

FIGURE 14 is a sectional view through the cylinder head of an engine showing another embodiment of our invention;

FIGURE 15 is a section on line 15—15 of FIGURE 14;

FIGURE 16 is a perspective view of a portion of the replacement top wall of the cylinder head of FIGURES 14 and 15;

FIGURE 17 is a bottom plan view of a replacement cylinder head wall of another embodiment of the invention, being taken on line 17—17 of FIGURE 18;

FIGURE 18 is a transverse sectional view through a cylinder head and replacement unit in accordance with the invention;

FIGURE 25 is a bottom plan view of the cylinder head of an L-head engine, showing certain thermally damaged areas, and showing the outlines of proposed replacement units;

FIGURE 26 is a section on line 26—26 of FIGURE 25, showing a replacement unit installed in the cylinder head;

FIGURE 27 is a section taken on line 27—27 of FIGURE 26;

FIGURE 28 is an elevational view of the replacement unit of FIGURES 26 and 27;

FIGURE 29 is a bottom plan view of an L-head engine cylinder head, with replacement units installed;

FIGURE 30 is a section on line 30—30 of FIGURE 32;

FIGURE 31 is a perspective view of the replacement unit of FIGURES 29 and 30;

FIGURE 32 is a section on line 32—32 of FIGURE 29;

FIGURE 33 is a plan view of a portion of the cylinder head on an overhead valve internal combustion engine;

FIGURE 34 is a section taken on broken line 34—34 of FIGURE 33;

FIGURE 35 is a side elevational view of the cylinder head of FIGURE 33, viewed from the port side thereof;

FIGURE 36 is a detailed section taken from FIGURE 34;

FIGURE 37 is a front elevation of the subject matter of FIGURE 36;

FIGURE 38 is an exploded elevational view of the replacement unit of FIGURES 33 to 35;

FIGURE 39 is a plan view of a portion of a cylinder head wall and replacement insert showing various means of securing the latter within the former;

FIGURE 40 is a plan view of a cylinder head wall showing various forms of expansion joints between the heated and cooler areas of the wall;

FIGURE 41 is a detailed section on line 41—41 of FIGURE 40;

FIGURE 42 is a detailed section on line 42—42 of FIGURE 40;

FIGURE 43 is a detailed section on line 43—43 of FIGURE 40;

FIGURE 44 is a vertical section through another embodiment of the invention, taken as indicated by line 44—44 of FIGURE 47;

FIGURE 45 is a perspective view of the insert unit of the embodiment of FIGURE 44;

FIGURE 46 is a perspective view of a packing ring of the embodiment of FIGURE 44;

FIGURE 47 is a section taken on line 47—47 of FIGURE 44;

FIGURE 48 is a side elevational view, with parts broken away, of the embodiment of FIGURE 44, incorporating, however, a modified securing means;

FIGURE 49 is a section taken on the broken line 49—49 of FIGURE 48;

FIGURE 50 is a perspective view of a spring member taken from FIGURES 48 and 49;

FIGURE 51 is a plan view of another illustrative embodiment of the invention;

FIGURE 52 is a section taken on the broken line 52—52 of FIGURE 51; and

FIGURE 53 is a view similar to a portion of FIGURE 52, but showing a further modification.

Figure 1:
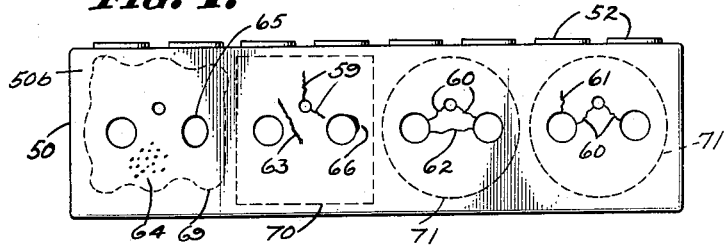
Figure 2:
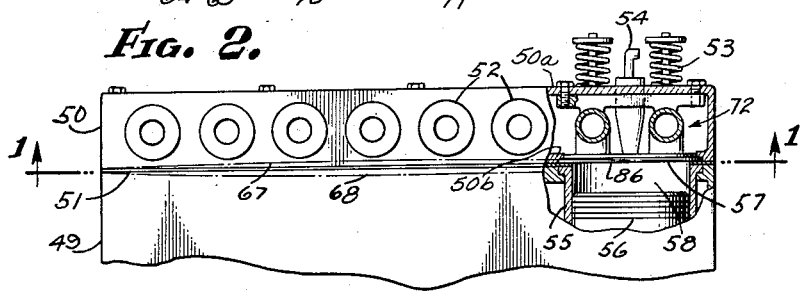
FIGURE 2 is a side elevational view of the block and cylinder head of the engine of FIGURE 1, with parts being broken away to show underlying parts in section, and showing the original head after cutting away certain parts thereof, including an area of the combustion chamber head wall, valve seats and valve guide support structure, and port tubes, and installation of a replacement unit therein.
Figure 3:
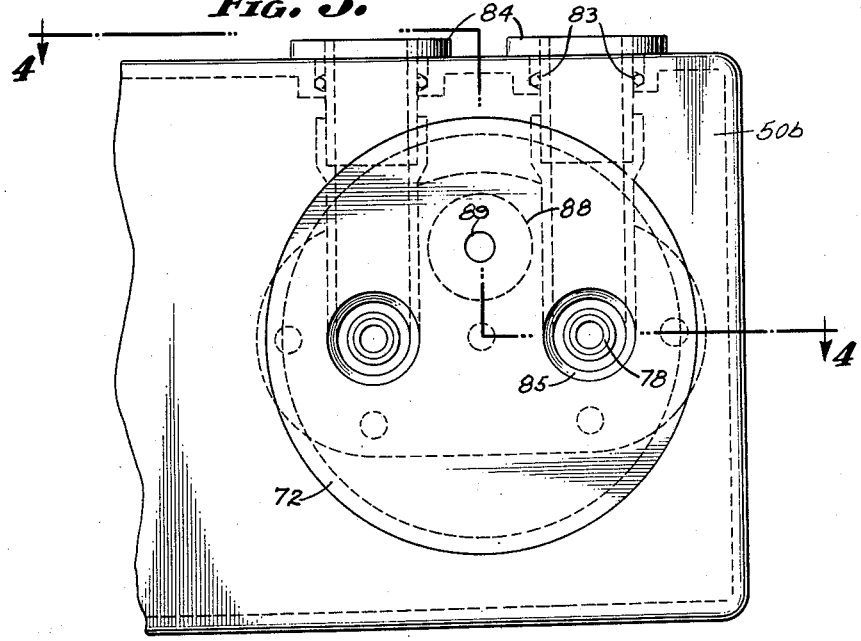
FIGURE 3 is an enlarged view of a portion of the cylinder head of FIGURES 1 and 2, shown after installation of the replacement unit.
Figure 19:
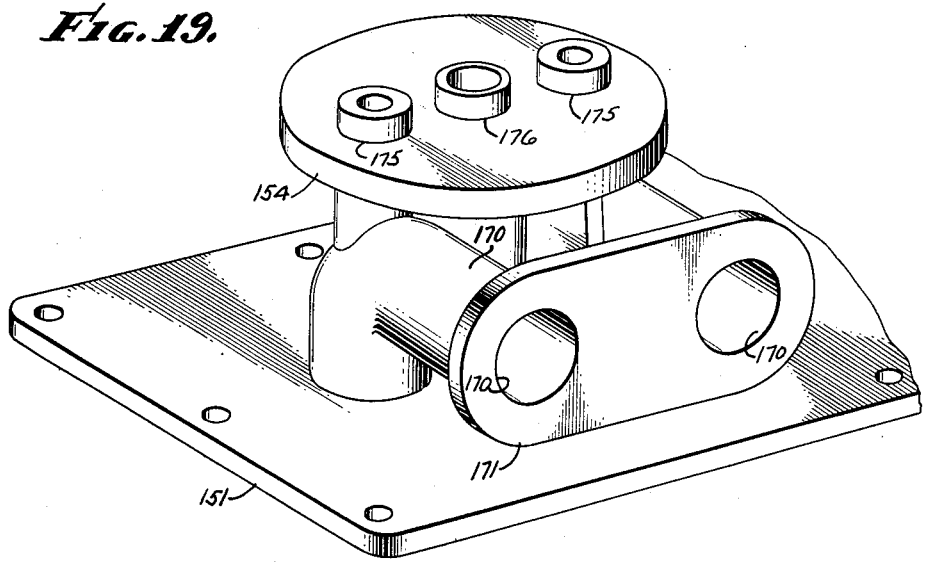
FIGURE 19 is a perspective view of the replacement unit of FIGURE 18.

Reference is first directed to that embodiment of our invention shown in FIGURES 1–6, inclusive. It will first be assumed that a repair job for a damaged engine is in contemplation, and it will later be pointed out that the structures described may also be incorporated in new engines.

The numeral 49 indicates a high compression diesel engine type valve-in-head cylinder block to which is secured cylinder head 50 with gasket 51 inserted between the block and head, both of which are provided with the usual valves, ports, fastenings and other necessary parts. Head 50 is a usual hollow casting having spaced upper and lower head walls 50a and 50b, and the space inside the head is supplied with coolant, in the usual manner.

The numeral 52 indicates the usual ports and 53 shows valve springs with an injector connection indicated by 54. In the block 49, a cylinder barrel is shown at 55 with a piston 56 located therein adjacent to the cylinder head surface 57, all of which define the combustion chamber proper indicated at 58.

In the original head wall 50b of head 50 are shown various damaged areas such as injector inlet cracks 59, injector to valve seat cracks 60, valve seat cracks 61, valve seat to valve seat cracks 62, and at 63 a crack occurring in the area between the valve seat and the injector inlet. At 64 are shown pits which result from the combination of combustion and water. The effects of distortion are indicated by an out-of-round valve seat at 65 and at 66 is shown a burned valve seat. Exaggerated illustrations of warpage are indicated at 67 for the head and at 68 for the block.

In repairing the damaged areas, portions of head wall 50b are excised along various shaped outlines, to be replaced by presently described replacement units, such as along the irregular outline shown by 69 or the square as at 70 and the circular at 71, all of which shapes may be used singly or in combination as required to produce the cut-out most suitable to the type of damage being repaired. It will be observed that the replacement outlines in each case encompass, with some overlap, the combustion chamber 58. Upper cylinder head wall 50a is also formed with a presently described opening to receive a presently described portion of the replacement unit. FIGURES 2–5 also show the original valve guide support structure, as well as port tubes, to have been cut away along with the removed portion of the original head wall, so as to accommodate the replacement unit now to be described.

Numeral 72 indicates a replacement unit which is introduced through the opening made in the bottom wall 50b of the cylinder head. This replacement unit includes at the top, a mounting plate 73, formed with an unthreaded centering boss 74, received and leak-proofed, as by sealing gasket 76, in aperture 75 cut through the top wall 50a of cylinder head 50. Mounting plate 73 engages and is held down by the underside of wall 50a, and machine bolts 77 secure it thereto. At the bottom, replacement unit 72 is provided with head wall 86, fitted, as presently described, into the opening made in head wall 50b, wall 86 being integrally formed with mounting plate 73, as shown.

The valve guide tube 78 is surrounded and positioned by valve guide structure 79 forming an integral part of the replacement unit casting, which casting also includes integral valve port tubes 80 structurally separated and spaced from one another above their integral juncture with wall 86, as shown. These port tubes are here shown to have, at their outer ends, connector bells 81 within which are tightly secured sleeves 82 extending through the original side wall of cylinder head 50 where they are secured with sealing gasket or O-rings 83 under sufficient pressure to prevent leakage, by adjustable gland nuts 84. This gland structure affords a sliding joint for the sleeves 82, to accommodate thermal expansion of the port tubes, and thus relieve stresses otherwise set up.

Valve seats 85 are provided in replacement unit head wall 86, which is ported into communication with port tubes 80.

The periphery of replacement unit head wall 86 is provided with what may broadly be termed an expansion joint or jointure 87 at its juncture with the edge of original head wall 50b that defines the opening cut therethrough, as heretofore described. This joint 87, in the embodiment of FIGURES 1–5, is so designed as to accommodate sliding movement of wall 86, relative to wall 50b, as the former expands to a greater degree than the latter as the engine heats up. In the present illustrative embodiment, the opposed peripheral edges of wall 86 and wall 50b are formed with complementary step grooves 86a and 50c, respectively, thereby forming projecting and overlapping ledges or flanges 86b and 50d, respectively, of which the flange 50d overlies and slidably engages the flange 86b. This arrangement causes the replacement unit head wall 86 to be held down, in part, by the wall 50b against the force of explosions occurring in the combustion chamber. The replacement unit is also held down by the upper wall of the cylinder head in engagement with replacement unit mounting plate 73. To permit the described sliding action, small clearance spaces, typically about .050 inch, will be understood to exist between the forward edge of each of said flanges and the bottom of the groove into which it is received when the engine is cold. In the drawings, the parts are illustrated in the heated or running condition of the engine, with the wall 86 thermally expanded, and the clearance spaces referred to will be understood to have become substantially closed, owing to the higher running temperature of wall 86 relative to wall 50b.

Under and inside of the described sliding jointure and extending entirely therearound, i.e., disposed on at least the inner side of the expansion joint between walls 50b and 86, and located between walls 50b and 86 above and the top of the engine block below, is compression sealing gasket 51 which serves to seal against leak of engine compression.

The injector tube is mounted in apertures 88 and 89.

Attention is directed to the fact that the rim portion of the combustion chamber wall 86 terminates shortly outside the circumference of the cylinder bore, and, of course, of the combustion chamber. The wall 86 is thus separated from any side walls contacted by coolant, only its upper surface being contacted thereby. Also, this rim portion projects beyond the circumference of the cylinder bore without any substantial thickening or peripheral reinforcement, so that the entire rim of wall 86, outside the cylinder bore, will be heated by conduction from the inner fire-contacted portion thereof to substantially the temperature of the latter and will thermally expand radially in all directions commensurately with the thermal expansion of the fire-contacted area of the wall 86. It will be seen that the entirety of the head wall 86 as so formed will run relatively hot, and will be subject to relatively uniform thermal expansion.

The method of engine repair represented by FIGURES 1–6 is as follows: First, the thermally damaged area of the original cylinder head wall 50b is cut away or excised, along a line encompassing, and spaced somewhat outside, the area of the combustion chamber. Other portions of the original structure integral with the removed portion of the head wall are removed, so that the head then appears as in FIGURES 4 and 5. An aperture 75 is cut through the top wall of the cylinder head for the boss 74 of the replacement unit. At the time the cylinder head is thus "opened up," it may be desirably cleaned out, sand blasted, and treated with rust inhibitor. A replacement unit is then fabricated, having replacement head wall 86 for the cut-away portion of the original head wall, and this replacement head wall is so designed as to have a sliding, expansion joint type of fit with the opening left in the original head wall. The replacement unit as described above is then installed with the sealing gasket 51 in place, and secured, as by screws 77. As described above, this replacement unit also includes new valve seats, valve guide support structure, and port tubes, the latter being fitted into the original side wall of the head. The repaired construction, which thus affords a two-part head wall, with an expansion joint between the parts, is strong and leak-proof against engine compression. The unit is held down by the overlapped flange construction at the jointure 87 and by the top cylinder head wall in engagement with mounting plate 73. Moreover, the replacement organization is designed to withstand warping and distortion of the very kind that is responsible for most repair jobs of the kind here in question, for the reason that the replacement head wall 86 has been furnished with a capability for equal thermal expansion in all radial directions relative to the remaining portion of the original head wall 50b. The replacement head wall or wall part 86, directly covering the combustion chamber, is subject to far greater heating than is the wall or wall part 50b outside the direct limits of the combustion chamber. By the sliding jointure provided, the higher temperature wall part 86 is permitted free and therefore equal thermal expansion in all radial directions, without forcibly abutting directly against the opposed edges of wall part 50b, and hence without setting up compression stresses in either or both of walls or wall parts 86 and 50b, with consequent inevitable warping, buckling, and ensuing distortions, as well as actual fractures, and also without causing the valve seats to be distorted into an oval shape, such that the valves will fail to seat properly thereon. By referring to FIGURE 4, it may be seen that as the wall 86 expands radially when heated, the two port tubes 80, being structurally separated above the wall 86, will be spread apart a slight distance. It will be seen that the temperature at the juncture of the port tubes with wall 86 will be that of wall 86 and that the operating temperature will be progressively lower in the upward direction through the port tubes 80 and into the valve guide structure 79 and frame or mounting plate member 73. However, owing to the integral construction of members 86, 80, 79 and 73, heat conduction up these members is maximized, and some degree of outward thermal expansion occurs throughout these portions of the casting 72, though, of course, being progressively less at higher and higher levels. The radial thermal expansion of the wall 86 thus tends to physically bend the port tubes 80 and the valve guide structures 79 very slightly outward, but at the same time, the heating of the integral structure 72 up to the level of the plate 73 causes the valve guide structures 79 to spread somewhat apart, so that good alignment of the valve guides with the valve seats is preserved. This result is proved by long life of valves, valve seats, long periods between necessary valve grindings, and improved fuel efficiency and power. It has also been discovered that the repaired engine, or an engine with a new cylinder head constructed as described, develops increased horsepower, and also appears to more completely burn its fuel. The black smoke, usually observed at the exhaust, disappears. This may be owing to maintenance of better compression due to better valve seating, or to hotter running combustion chamber walls. Apparently, the heat of the engine is more favorably utilized.

Troubles of the kind causing the necessity of the repair job are thus removed. Further, insofar as valve seating is concerned, the repaired engine is far superior to the original engine. The structure described is desirable and intended for new engine constructions, as well as repair jobs. When used in new engines, the thermal stresses described as responsible for warping, fracturing, and poor valve seating, are prevented at the outset, and the necessity for repair jobs, including frequent valve grinding, owing to the results of unrelieved stresses is, therefore, avoided.

As an alternate construction to the one-piece replacement, the numeral 90 (FIGURE 6a) indicates a modified form of replacement comprising head wall 90a, and integral port tube 91, connecting bell 92 and centering boss and valve guide housing 93. The replacement includes an auxiliary mounting plate 94 having aperture 95 for the centering boss and valve guide housing 93, and provided with a plurality of reinforcing legs, rod or studs 96 which bear upon the top of head wall 90a to support and transfer the explosion stresses to the top wall or other suitable portions of the cylinder head.

In FIGURE 7 is shown a modified embodiment of the invention. Here, the entirety of the bottom wall of the cylinder head has been removed as a first step of a repair procedure. The cylinder head is thus better opened up to facilitate cleaning. In its place is installed a new bottom head wall 102, furnished with holes to receive the usual cylinder head studs, not shown. The new bottom head wall 102 has apertures 103 over the several cylinder barrels of the engine, and understood, as in FIGURES 1–6, to encompass and be somewhat larger than the cylinder bore (or combustion space thereover). The replacement unit, generally designated by numeral 98, includes mounting plate 98a, similar to that used in FIGURES 1–6, valve guide members 98b, port tubes 99 provided with sealing gaskets or O-rings 100 tightly secured by adjustable gland nuts 101, in which the tubes 99 may slide to accommodate thermal expansion, and replacement head wall 104 integral with port tubes 99, received in aperture 103. A removable centering boss 106 is received into aperture 106a, cut through the top wall of the cylinder head. A narrow gap 105 entirely separates and isolates the replacement head wall 104 from the defining edge of the aperture 103 in the replacement bottom head wall 102, thus providing for thermal expansion of wall 102 within aperture 103. As before, the drawings show the engine in its heated or running condition, with the said gap 105 substantially closed. It will be understood, however, that the relationships are made such that, with the engine heated, and replacement head wall 104 at higher temperature than cylinder head bottom wall 102, substantial compressive stresses, owing to differential expansion, are not transferred from wall 104 to wall 102. As in the embodiment of FIGURES 1–6, a compression sealing gasket 107 is installed underneath and inside the expansion joint formed between the walls 104 and 102, effecting a compression seal to the top surface of the cylinder block.

FIGURE 8 shows a modification of a portion of FIGURES 1–5, similar parts having like reference numerals. The mounting plate 73 of FIGURES 1–5 is here divided into two mounting plates 73a and 73b, each integral with one of the port tubes 80 and valve guide structure 79. The mounting plates 73a and 73b are flush with the underside of top wall 50a, and valve guide tubes 78 are fitted with annular clearance in apertures 75. Ring seals such as 75c seal against coolant reaching the apertures 75. The mounting plates 73a and 73b are designed to shift laterally, that is, spread apart relative to one another, as the insert unit heats up and expands, and therefore are not fastened to the top wall 50a of the casting by screws or bolts. To facilitate such movement, bearing balls 73c may be installed, as indicated, between members 73d and 73b and top head wall 50a. These bearing balls take the load, and head wall 50a does not exert pressure on members 73a and 73b, excepting through these bearing balls. By this provision, the port tubes and valve guides are free to spread apart with thermal expansion of insert head wall 86, assuring perfect alignment of valve guides with valve seats at all times.

FIGURES 9–13 show an embodiment of the invention in which, in addition to excising a damaged portion of the original head wall of the cylinder head, the side wall of the original head, through which the engine ports extend, is also removed, and in which the replacement unit includes a replacement side wall, as well as a replacement head wall.

Referring to FIGURE 10, it will be seen that the cylinder head 114 has a head wall 122, from which a damaged area has been excised, and it will be understood that the aperture so formed is again of a size to encompass the cylinder bore below, with some overlap, as in FIGURES 1–6. As also shown in FIGURE 10, the original side wall of the cylinder head has been removed on the ported side. The replacement unit 108 includes a new side wall portion 109 formed with port bosses 110, and secured in place by machine screws, as shown. It also includes mounting plate 111, engaged and buttressed by machine screws 112, threaded through the upper head wall, and replacement head wall 119 fits within the aperture formed in the original head wall with a clearance space all around, as indicated at 120. Below and inside the thermal expansion joint so formed is placed compression sealing gasket 123. A port tube 117 joins wall 119, mounting plate 111 and side plate 109. A valve seat 118 is formed in the bottom of wall 119, in communication with a bore leading to port tube 117. As shown in FIGURE 10, a centering plug 113 is seated in a socket in the top of mounting plate 111, being threaded in a bore formed in the top wall of cylinder head 114, and valve guide 115 extends through this centering plug and through plate 111 to protrude into the passage above valve seat 118.

FIGURES 12 and 13 show a modification of FIGURE 10, wherein the port tube 124 is fitted into and slidingly extends through a port boss 126 on a separate removable side plate 125, a gasket or seal ring 127 and gland sleeve 128, sealing the port tube against leakage.

The procedure involved in making a repair according to FIGURES 9–12 will be evident from the foregoing. The expansion joint, in this instance an open gap 120, isolates the hot region 121 from the lower temperature area 122, as before, permitting unrestricted thermal expansion of the replacement head wall 119 without transferring stress to the wall 122, and so avoiding warping and buckling strains in both members. An effective compression seal is again afforded by the gasket 123. As in the cases instanced hereinabove, the construction of FIGURES 9–13 lends itself to new engine structures, as well as to the repair of damaged engines. In either case, damage to the engine by reason of thermally induced stress differentials between the highly heated region 121 and the less highly heated region 122, as well as distortion of valve seats, are prevented.

FIGURES 14–16 show an alternative embodiment, intended as original engine structure. The insert unit, designated generally by numeral 129, is placed within head 135, which has a removable top wall 130, fastened to the balance of the head by screws 131 reaching down and threaded into the cylinder block. Top wall 130 is provided with apertures 133 for positioning bosses 132 on the insert unit, O-ring seals 134 being shown for sealing purposes, and the insert unit has an upper plate portion 129a which is engaged by the removable wall 130. The insert unit has a lower head wall 147, provided with a sliding, overlapped type of thermal expansion jointure 145 with the lower wall of the cylinder head, similar to that described in connection with FIGURES 1–6, excepting that in this case the projecting flange on the head wall 147 overlies a complementary flange on the lower wall of the cylinder head, so that the insert unit is in this instance installed from above. A compression sealing gasket 146 is used, as in earlier embodiments.

Valve guide 136 is surrounded by casting portion 137 forming a part of insert 129. Port tubes 138, also a part of insert 129, are provided with a threaded connector bell 139 for threaded reception of connector sleeves 140 which are provided with a sliding fit through sealing gasket or O-ring 141 under pressure from adjustable gland sleeves 142 in port bosses 143. Valve seats 144 are provided in insert wall 147. An injector 149a is inserted through aperture 149 in removable top plate 130 and through aperture 148 in insert wall 147.

FIGURES 17–24 show further modifications of the invention, illustratively of the type wherein the original bottom wall of the cylinder head is removed, and applicable also in new engines. In this case, the replacement or insert unit 150 includes a plate or wall 151 which replaces the entire original bottom wall of the cylinder head. This replacement unit includes mounting plate 154 underlying and engaged by the top wall of the cylinder head, a valve seat 156 in wall 154, a centering boss 175 fitted and sealed at 177 in an aperture cut through the top wall of the cylinder head, an injector aperture 176 in which the injector 176a is received and sealed, a valve guide portion 153, and port tube 170. The port tube 170 is provided with a flange 171 for fastening to port boss 173 by means of screws 172, a sealing gasket being used at 174.

The plate or wall 151 is divided into two parts 160 and 161 by a thermal stress relieving jointure, several illustrative forms of which are shown in FIGURE 17 and FIGURES 20–24, inclusive. This jointure will be understood to again encompass and extend somewhat outside the combustion chamber area over the cylinder bore (not shown), and has under and extending inside it, a compression sealing gasket 167. The two parts 160 and 161 of wall 151 may be integrally connected across the jointure, or separated therefrom, according to the specific joint design.

Figure 20:
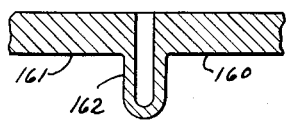
FIGURE 20 is a detailed section taken on line 20—20 of FIGURE 17.

At 162 in FIGURE 20, the jointure comprises a flexible, imperforate fold or loop 162, permitting radial expansion and contraction of highly heated inner part 160 relative to the cooler outer part 161.

Figure 21:
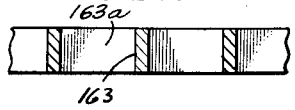
FIGURE 21 is a detailed section taken on line 21—21 of FIGURE 17.

In FIGURE 21 is shown a jointure comprising frangible webs 163 across a circumferential slot 163a. This structure permits a degree of expansion and contraction of inner part 160 relative to outer part 161; but if deformation is excessive, the frangible webs 163 may fracture, with no harm to the engine, the fracture being confined to a predetermined location at which no engine damage requiring repair has been done.

Figure 22:
FIGURE 22 is a detailed section taken on line 22—22 of FIGURE 17.

In FIGURE 22, the parts 160 and 161 are separated by a circumferential clearance space or gap 164 accommodating expansion and contraction of inner part 160.

Figure 23:
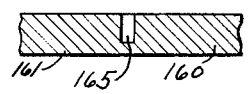
FIGURE 23 is a detailed section taken on line 23—23 of FIGURE 17.

In FIGURE 23, the jointure comprises a deep circumferential groove 165, leaving a thin, frangible connecting portion which may fracture upon becoming highly stressed. As in FIGURE 21, such fracture occurs along a predetermined line where no harm to the engine is done.

Figure 24:
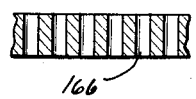
FIGURE 24 is a detailed section taken on line 24—24 of FIGURE 17.

Finally, FIGURE 24 shows a frangible jointure comprising a plurality of close spaced drill holes 166.

By way of further illustration of stresses set up in the head wall or plate 151 during heating and cooling of the engine, we have, in FIGURE 17, represented at 158 thermal tension stresses acting across the jointure, and at 159 thermal compressive stresses, these developing owing to the fact that the inside part 160, directly exposed to the flame, is heated to much higher temperatures than the outside part 161, which is heated only by conduction, and in addition is liquid cooled, causing greater alternate and continuous expansion and contraction of part 160 as compared with part 161. The heated part 160 opposes the cooler part 161. The jointures shown are capable of accommodating the expansion and contractions of part 160, and relieve the stresses represented at 158 and 159.

In FIGURES 25–28 are shown a replacement, or new construction, for the cylinder head 208 of an L-head internal combustion engine. Referring to FIGURE 25, spark plug apertures are indicated at 209. At 210 is represented a transverse crack due to a longitudinal strain, at 211 a longitudinal crack owing to a transverse strain, and at 212 a transverse crack extending inwardly from spark plug aperture 209. At 213 and 214 are shown, respectively, single and two cylinder replacement or insert units. Referring now to FIGURES 26 and 28, the replacement or insert unit 213 is provided with peripheral head wall flange 218, with which is integrally formed combustion chamber head wall 218a. Joined with the upper portion of combustion chamber head wall 218a is spark plug housing 215, which protrudes through and is sealed, as at 217, within an aperture formed in the top wall of head 208, thus functioning as a positioning means. The flange portion 218 of the replacement unit is provided with a sliding, expansion jointure 219 with the opposed wall edge left when the damaged area of the original head wall was excised. It will be understood, in line with discussions of earlier embodiments, that the first step in the procedure, in the case of a replacement, is to excise the original, damaged head wall along such an outline as 213. The sliding jointure is here shown as of the above-described overlapped flange type, with freedom for thermal expansion of the replacement by sliding action of the jointure flanges on one another to take up originally provided clearance space. An underlying compression sealing gasket is used, as at 220.

FIGURES 29–32 show a modification of the L-head engine cylinder head of FIGURES 25–28. Here it may be assumed that an entirely new cylinder head is provided, assembled from separate side and top wall components. Alternatively, the damaged lower head wall of the original cylinder head is also completely removed, leaving only the side wall 221 of the original cylinder head. An insert unit 225 is provided, and includes a combustion chamber defining wall 225a, with a marginal flange 225b having its lower edge 230 in engagement with cylinder block 232. As indicated, this edge encompasses the cylinder bore below, and the entire length of the combustion chamber (FIGURE 32). Head plate 222 is provided, resting down on the upper edge of the side wall 221, and a sealing gasket or O-ring 223 seals the juncture therebetween. Head plate 222 is held down to block 232 by means of studs 224. The insert unit is provided with posts 228 which are engaged by plate 222 for purpose of adequate support of the replacement unit against explosion pressure. The insert unit is further provided with spark plug housing 226, which is peripherally engaged by plate 222, and sealed at 229, an access hole 227 for the plug being formed in plate 222. A compression sealing gasket 231 underlies the lower insert edge 230. It will be seen that the marginal wall portion or flange 225b is spaced by an expansion gap from the cylinder head side wall 221, and therefore is unconfined by and isolated from the latter, so that it is free for expansion and contraction movements.

FIGURES 33–38 show a replacement, or new construction, for a head wall of an overhead valve internal combustion, spark plug engine. The lower wall of the original cylinder head 233 is cut away on an outline encompassing the cylinder bore in the block 253. The replacement or insert unit 235 has at the top a mounting plate 236 adapted to be engaged by the underside of the top wall of head 233, and formed with centering boss 239 received and sealed, as at 241, in aperture 240 formed in the top wall of the head. Extending downwardly through this centering boss 239, and opening into port tube 242 in a position over valve seat 252, is a valve guide tube 237. The port tube 242 joins the replacement wall 235a that defines the new combustion chamber, and this wall 235a is formed with a peripheral flange 235b that is fitted in the aperture in the remaining portion of the original head wall, using, in this instance, a sliding expansion joint at 250 of the type described in connection with FIGURES 1–6, a compression sealing gasket 251 being used, as shown. Port tube 242 is formed with an internally threaded connector bell 243, into which is threaded connector sleeve 244 held in sliding but leak-proof condition by sealing gasket or O-ring 245 and adjustable threaded gland sleeve 246 threaded into port boss 249. Sleeve 246 is preferably formed with cogs 247 for tightening by means of an adjusting tool or pin through holes 248 in port tube boss 249. A spark plug housing 254 is threaded through the side wall 235a of the replacement unit, and has a tubular external portion 254a which protrudes through an aperture 256 formed in the side wall of cylinder head 233, being sealed therein by O-ring seal 257.

In FIGURE 39 are shown various means of aligning a replacement or reconditioned head wall 258a in a cylinder head wall 258. The wall 258a may be of any shape, though here shown as circular, being fitted into the circular aperture 259 which has been formed in original head wall 258. Valve apertures are shown in wall 259a at 260, and an injector port at 261. An aligning and securing pin is illustrated at 262, inserted in an aperture half formed in wall 258 and half formed in wall 258a. At 263 is indicated a screw, threaded half into wall 258 and half into wall 258a. A spot welded juncture is indicated at 265, and a brazed joint at 264. Between the fastenings, the walls 258 and 258a may be unconnected. These spaced fastenings permit limited working of the wall 258a within the wall 258, thus affording some flexibility and accommodation for thermal expansion of the member 258a relative to member 258.

FIGURES 40–43 show various expansion joints formed in the lower head wall 266 of a cylinder head, between the highly heated regions directly over the cylinder, and the cooler regions outside thereof. The original head wall is formed with bores 267 for holding the unillustrated head casting above the wall 266, and the wall 266, tightly down to the block, also not shown. Wall 266 is shown furnished with valve apertures 268, injector aperture 269, and air inlet aperture 279. The arrows 270 and 271 diagrammatically represent thermal tension and compressive stresses, respectively, occurring across the regions between the highly heated and highly stressed central area 272, over the cylinder bore, and the cooler and less stressed outer areas 273. The expansion joints illustrated relieve these stresses, which are developed as the engine heats and cools. The joint at 274, consisting of a line of perforations, connected by web portions capable of easy fracture, forms a frangible type of joint, which has certain inherent flexibility to accommodate expansion and contraction, but which will fracture upon occurrence of substantial stresses. The fracture that may occur is along a predetermined line in a preferred location, such as will not put the engine out of running commission. An alternative groove type joint is indicated at 276, the bottom of which comprises a frangible web 277, and has properties similar to the joint discussed immediately above. At 278 is shown a through slot, which may extend entirely around the inner wall region 272, isolating it completely from the outer wall region 273. In other words, by this construction, the wall is separated into inner and outer wall portions, separated by a clearance or gap, and permitting substantial thermal expansion of the inner wall portion relative to the outer wall portion without abutment taking place, with resulting compressive stresses in the members. These joints will be understood to be equipped with sealing gaskets such as disclosed in earlier embodiments; and the inner wall member 272 will further be understood, in practice, to be furnished with any suitable hold-down means, such as disclosed in connection with earlier embodiments, and such as will maintain it in position notwithstanding complete severance from the outer wall member 273.

In FIGURES 44–49, we have illustrated a valve-in-head diesel engine head 290, closely resembling a known commercial head, but modified to accept an insert unit 291 in accordance with the invention. In these figures, FIGURES 48 and 49 show the same head and insert unit as FIGURES 44–47 excepting only for a modified means for lateral securement of the insert unit in the head, and like reference numerals are used throughout. FIGURES 48 and 49 are, accordingly, illustrative, excepting for securement means, of certain details of the structures of FIGURES 44–47. A conventional block is shown at 292, having cylinder bore 293 and coolant jacket 294. Head 290 is held down to block 292 by usual studs 295, a gasket 296 being used therebetween.

Head 290 has top wall 297, side walls 298 and bottom wall 299. The bottom wall 299 has been milled out to afford an opening 300 therein exceeding the diameter of the cylinder bore by a small margin, and this opening 300 is deepened at the bottom by a step groove 301.

The insert unit 291 comprises a unitary casting which is introduced into the interior of the head through the bottom opening 300. The casting includes a bottom wall 302, designed to serve as the top, defining wall of the combustion chamber and this bottom wall is preferably of substantially the same thickness as wall 299, and is preferably of substantially the same thickness throughout. The periphery of this wall 302 is step grooved, as at 303, so as to be complementary to the step-grooved inner periphery of opening 300. Clearance spaces, of the order of about .050 inch are provided between the projecting tongue 304 of wall 302 and the bottom of groove 301, and between the projecting tongue 305 of wall 299 and the bottom of groove 303, as indicated. The tongues 304 and 305 interengage vertically, thus limiting upward movement of unit 291, and aiding in the support of the latter against combustion pressure.

Formed in insert bottom wall 302 are valve seats 308 for overhead valves 309, and integral with and rising from wall 302, inwardly of the periphery thereof, and around each of seats 308, is port tube and valve guide supporting structure designated generally by numeral 310. This structure includes a top 311, which engages upwardly against a machined undersurface of the top wall 297 of head 290. Extending downwardly from top 311 in axial alignment with valve seats 308, are tubular bosses 314 which tightly receive the lower portions of guide sleeves 315 for valve stems 316. Sleeves 315 project through and above top head wall 297 through apertures 317 therein, and have, above wall 297, shoulders 318 for valve springs 319. As clearly shown, the shoulders 318 are of lesser diameter than apertures 317. Surrounding sleeves 315 immediately below shoulders 318 and above the top surface of insert top 311 are packing rings 320. These rings 320 are received freely in apertures 317, and their inner diameters are slightly greater than the diameters of sleeves 315, whereby the sleeves are capable of slight lateral shifting within the rings and therefore relative to head top wall 297. Rings 320 are sealed within apertures 317 by O-ring seals 322, and to insert top 311 by O-ring seals 323.

Above each of valve seats 308 is a port tube passage space 325 (FIGURE 47), which joins port tube passage 326 located immediately outwardly thereof. These port tube passages 326 are defined by port tube members 327 terminating unidirectionally in end faces 328 which are in a common vertical plane, and which are adapted for coupling to later-described port tube members which are integral with head 290. The port tube members 327 integrally merge at the top with top member 311, and at the bottom with bottom wall 302. They also include curved wall portions 329 enclosing the aforementioned spaces 325.

It is to be observed that the wall portions 329 of the two port tubes 327 are separated and spaced from one another, affording coolant circulation space 330 therebetween. This separation of the two port tubes also permits a small but desirable and important separative movement therebetween as the bottom wall 302 becomes highly heated and expands during running of the engine.

Bottom wall 302 of insert unit 291 is furnished, immediately in front of and between valve seats 308, with an angularly disposed threaded orifice 330 to receive the threaded extremity of a generally cylindrically formed precombustion chamber and fuel injection barrel 332. This barrel 332 will be understood to contain both a precombustion chamber and a fuel injector, of conventional type, whose internal details need not be shown. It is generally representative of any of various auxiliary devices which may be carried by the insert unit, such as precombustion chambers, fuel injectors, glow plugs, or the like, and which, according to the invention, passes through the upper wall of the head, with accommodation for lateral shifting relative thereto. For the purpose of claims, the unit in question is referred to broadly as an auxiliary barrel. This barrel 332 is installed from the top through an aperture 333 in top wall 297 of head 290. Reference for best illustration of these ports is here made to FIGURE 48, which shows the same head and insert unit as disclosed in FIGURES 44–47, excepting only for certain later-described optional details as regards securing the insert unit within the head. Also as best shown in FIGURE 48, the head is formed with a partially cutaway cylindric wall 334 which cradles and supports the barrel 332. At its lower end, this wall 334 engages a raised pad 335 on insert bottom wall 302. Shortly above its lower end, wall 334 has an angular seat 335 which is engaged for support by a frusto-conical seat 336 on the barrel 332. Near its upper end, the barrel 332 has a shoulder 338 of a diameter somewhat smaller than aperture 333, and above said shoulder is a portion 340 of reduced diameter. A packing ring 341 encircles portion 340 immediately above shoulder 338, and is loosely fitted in aperture 333. An O-ring seal 342 in ring 341 seals to the wall of aperture 333, and another O-ring seal 343 in said ring seals to shoulder 338. A retaining ring tightly mounted on the barrel confines ring 341 in position, and is set up only loosely against ring 341, so as to permit relative lateral shifting of said ring on the barrel 332. The barrel 332 is thus packed in a fluid-tight manner, but afforded the capability of slight lateral shifting relative to head 290.

Referring to FIGURE 44, and particularly to the right-hand portion thereof, the interior of the casting is cored out to the dotted line 350 to define side wall 298, and to afford coolant space, and certain webs have been provided, as indicated, including a vertical web 351 whose bottom edge is engaged by bottom wall 302 of insert unit 291.

FIGURE 44 shows also one of two parallel port tubes 354 formed integrally with the left-hand side wall of the head and projecting upwardly to mate with the end face 328 on the corresponding port tubes 327 of the insert unit, a gasket 355 being used therebetween. The entire insert unit is secured to head 290 by means forcing its port tubes 327 toward and into pressure engagement with the ends of the port tubes 354 of the head. In FIGURE 49, this means is in the form of studs 354 located in pairs of upper and lower longitudinally bored bosses 355 and 356, respectively, threadedly engaged into unit 290 above and below the port tube passages. These studs are set up tightly, and effectively close the port tube joints. In FIGURE 49, lower bosses 356 also engage and cooperate in holding down the top of lower wall 302 of the insert unit. All points of vertical engagement between the insert unit and head comprise horizontal machined surfaces, permitting relative horizontal shifting therebetween in original installation or owing to thermal expansion of the insert unit when heated. At 358 is indicated an external manifold, bolted to head 297, in communication with port tubes 327, and it will be understood that both intake and exhaust manifolds will be provided to communicate with the intake and exhaust port tubes of the head.

In FIGURES 48 and 49, the rearward sides of the port tube walls are engaged by the two ends of a flat spring 360, which is engaged between its ends by a stud 361 threaded through a boss 362 projecting from the adjacent side wall of the head. The stud projects also through said side wall, with its head on the outside, and a lock nut 363 is set up against the side wall when stud 361 has been adjusted. The stud is adjusted to exert sufficient force on spring 360, and therefore, on the insert unit, to effect the necessary pressural coupling between the port tubes of the insert unit and those of the head.

The engine structures shown in FIGURES 44–49 have the features and advantages mentioned earlier, particularly in connection with FIGURES 1–6, as regards freedom from unrelieved thermal stresses and strains, warping, distortions, fractures, distortions of valve seats and guides, etc. The structures of FIGURES 44–49 have certain additional advantages. For example, the top wall 311 of the insert unit is unsecured to the top wall of the head, and arranged for slight relative horizontal shifting relative thereto with any thermal expansion that may occur. Accommodation is also made for corresponding shifting of the valve stem guides. The loose fit thereby made necessary between the valve stem guides and the guide apertures in the top wall of the head has been effectively sealed by a novel sealing arrangement. Similar accommodation, and sealing, has been afforded for the fuel injector unit.

The integral construction of the bottom wall, and port tubes and valve guide structure of the insert unit, as well as the physical separation of the port tubes from each other, are deemed to be important features of the invention. The integral construction results in gradual heat gradients, rather than step-like temperature changes, in the upward and outward direction from the bottom wall 302 through the port tube walls, the valve guide supporting walls, and the top member 310, whereby thermal expansive stresses are smoothly tapered out, and large stress differences between adjacent connected members are avoided. The separation of the two port tubes from one another between the bottom wall 302 and the top member 311 permits the two left and right wall portions of the unit above wall 302 (as viewed in FIGURE 47), to move slightly apart when the lower wall 302 is heated and radially expanded. The temperature is, of course, highest in lower wall 302, and the latter tends to expand horizontally equally in all radial directions. Thereby, the roundness of the valve seats is preserved under heated, running conditions. The juncture of the lower portions of port tube walls 329, just above the valves (see FIGURE 47), is heated comparably with the bottom wall, and expands commensurately therewith. Higher up, the port tubes taper off in temperature; and the physical separation thereof permits them to separate, by a slight bending movement relative to top member 311, to follow the radial expansion of the bottom wall 302. The top wall 311 is also heated to some extent, and expands outwardly, being permitted such movement by lack of positive securement to the top wall of the head. This expansive movement accommodates to some extent the opposite horizontal movement of the port tubes with the radially expanding bottom wall. It will be seen that the greatest expansion occurs within the bottom wall 302, but that the insert structure as a whole has been formed to follow this expansion to a large extent, the capability for so doing being substantially complete immediately above wall 302, and tapering off gradually in the upward direction. The expansion attained at all points is adequate to assure greatly improved retention of alignment of valve guides with valve seats, in the heated, running condition of the engine.

There have been shown and described a number of unique coupling arrangements between port tube members of the insert unit and mating port tube members or arrangements on the head. FIGURES 51 and 52 show a further arrangement, adapted particularly for a type of engine in which intake and exhaust manifolds are on opposite sides of the head. The block, indicated at 400, has cylinder bore 401, and head 402 is mounted conventionally on the block, gasket 403 being used therebetween. The bottom wall 404 of head 402 has aperture 405 over and somewhat larger than bore 401. Head 402 also has opposite side walls 406 and 407, and top wall 408.

Insert unit 410 is placed inside head 402 over bore 401, its bottom wall 411 engaging upwardly against spaced lugs 402a formed on head bottom wall 404, one of which appears in FIGURE 52. Wall 411 overlies a narrow ledge of block 400 inside aperture 405, and there is a narrow clearance space or expansion joint 411a between the periphery of wall 411 and the inner periphery of aperture 405.

Wall 411 has insert valve seat rings 413 affording seats for an intake valve 414 and an exhaust valve 415, the latter having valve stems 416 and 417, respectively.

Insert unit 410 comprises, as in earlier embodiments, a unitary structure integral with and rising from bottom wall 411. This structure includes separated intake and exhaust port tube members 420 and 421, respectively, each integral at the bottom with wall 411 around the respective valve seats, and each integral, through valve guide sleeves 422, with a top plate member 422. The port tube members 420 and 421, as well as the valve guide sleeves 422, are to be understood to be spaced from one another substantially from bottom wall 411 to top plate 423, in the general manner of previously described forms of the invention. Top plate member 423 engages the underside of top head wall 408, as shown. Valve guides 422 receive tubular valve guides 424 for valve stems 416 and 417. Each guide 424 has an enlarged shoulder 425 received with clearance in an aperture 426 in top head wall 408, whereby to accommodate a slight lateral shifting of the insert unit. Sealing of the coolant chamber inside the head against leakage through aperture 426 is accomplished by O-ring seals 427 placed in grooves 428 in the underside of wall 408 around apertures 426 and engaging the top side of memmber 423.

Exhaust port tube 421 is faced off vertically at its end, as at 438, and meets a port tube member 431 formed integrally with an extending inwardly from head side wall 407, member 431 being bored to accommodate screws 432 threaded into the end of port tube member 421. A gasket 433 is used between port tube members 421 and 431. An exhaust manifold, fragmentarily indicated at 434, is secured and gasketed to the side of head 402 over exhaust passage 435.

It will be seen that, owing to connection of insert unit 410 directly to port tube member 431, and to the fact that unit 410 is capable of slight lateral shifting with reference to the top and bottom walls 408 and 404, respectively, of the head, the insert unit may move bodily in a lateral direction to a small degree owing to thermal expansion and contraction of the parts. Accordingly, novel provisions have been made whereby such expansions or contractions are unhindered by the intake port tube arrangements. As shown, intake port tube 420 is formed at its extremity with a bell mouth 440, and a somewhat thin walled port tube 441 is provided, one extermity of the latter being received with a small clearance within bell mouth 440, and being pressure sealed therein by means of a heat resistant O-ring seal 442. The other end of tube 441 is received in a port 444 in the head side wall, its extremity being flanged over as at 446 and received in a counterbore 447 in wall 406, fastening screws 448 securing the tube in position. An intake manifold, fragmentarily indicated at 449, is secured to the head over port 444. It will be evident that the intake port arrangement shown and described provides for limited movement of the insert unit 410 relative to port tube 441, facilitating installation, as well as accommodating slight lateral shifting of the insert unit owing to thermal expansion or contraction.

FIGURE 53 shows an alternative port tube arrangement for accommodating small lateral shifting of the insert unit. A block is fragmentarily indicated at 450, and bottom and side walls of an insert unit 451 at 452 and 453, respectively. An expansion joint 454 is provided between insert unit bottom wall 455 and head bottom wall 452. The insert unit has individual port tubes 456 integral with and rising from bottom wall 455, only one of which appears in the drawing. In general respects, the head and insert unit will be understood to follow the teachings of earlier described embodiments of the invention.

Port tube 456 is faced off at 458, and a corrugated metallic bellows 460 serves as a flexible, expansive and contractive port tube member between end face 458 and the ported side wall of the head. Bellows 460 is extended at each end around a retainer ring 461, which at one end abuts end face 458 and is secured thereagainst by screws 462, and at the other end is fastened by screws 463 to a port ring 464 seated in a counterbored opening 465 in side wall 453. Gaskets 466 are used between the ends of the bellows and the face 458 and port ring 465. Manifold 468 is secured to wall 453 as by screws 469, and holds the port ring 465 in position.

The expression "cylindrically bored block" as used herein is to be construed as inclusive of, but not limited to, a block having an inserted barrel providing a cylinder bore.

While a number or representative embodiments of the invention have been disclosed herein, it is to be understood that they are for illustrative purposes only and that various changes in design, structure and arrangement may be made without departing from the spirit and scope of the present invention.

What is claimed is:

1. A cylinder head for the cylindrically bored block of a liquid-cooled internal combustion engine, comprising: walls defining a hollow, liquid-cooled cylinder head, including a two-part wall structure applicable to the top of the block, said wall structure including an inner, liquid cooled but hot-running wall member over and circumscribing the cylinder bore in the block and having a flame-contacted combustion-chamber-defining portion over said cylinder bore, said inner wall member being unsecured to the block and being thermally radially expansive independently of the block, and an outer, liquid cooled, non-flame-contacted and cooler-running wall member outside and around said inner wall member, there being a thermal expansion joint between said inner and outer wall members extending entirely around the periphery of said inner wall member for accommodating free thermal expansion of said inner wall member in all radial directions relative to said outer wall member, said inner wall member having a rim portion projecting outside the circumferential limits of said cylinder bore but terminating shortly beyond the flame-contacted portion of said wall member so as to heat by thermal conduction from the flame-contacted portion of said inner wall member to substantially the temperature of the latter and thereby thermally expand commensurately therewith whereby to avoid resistance to thermal expansion of said flame-contacted portion of said wall member.

2. The subject matter of claim 1, wherein said inner wall member has intake and exhaust ports extending therethrough, and including valve seats on said wall member around said ports, said valve seats being substantially free from distortion from round toward elliptical shape when said bottom wall member is heated by reason of said accommodation for equal thermal expansion of said inner bottom wall member in all radial directions.

3. A cylinder head for the cylindrically bored block of a liquid-cooled internal combustion engine, comprising: walls defining a hollow, liquid-cooled cylinder head, including liquid-cooled top and side walls and a liquid-cooled outer bottom wall member extending inwardly from said side wall and applicable to the top of the block, said bottom wall member having an opening therethrough circumscribing and marginally spaced outside the perimeter of the cylinder bore in the block, a flame-contacted combustion-chamber-defining inner wall, received in said opening in said bottom wall member, said combustion-chamber-defining wall being applicable to the block over said cylinder bore and a margin thereof exceeding the perimeter of said bore, so that said margin is not fire contacted, said margin being narrow and of small bulk relative to the dimensions of the balance of said inner wall, whereby to heat by conduction to substantially the temperature of the fire-contacted portion of said inner wall just inside said margin, there being a thermal expansion joint between the entire outer periphery of said inner wall and the opposed inner periphery of said opening in said bottom head wall, such as to afford capability for free thermal expansion therein in all radial directions, said combustion-chamber-defining wall member having intake and exhaust ports extending therethrough, and valve seats on said combustion-chamber-defining wall member around said valve ports.

4. A cylinder head for the cylindrically bored block of a liquid-cooled internal combustion engine, comprising: walls defining a hollow, liquid-cooled cylinder head, including liquid-cooled top and side walls and a liquid-cooled outer bottom wall member extending inwardly from said side walls and applicable to the top of the block, said bottom wall member having an opening therethrough circumscribing and marginally spaced outside the perimeter of the cylinder bore in the block, a flame-contacted combustion-chamber-defining inner wall received in said opening in said bottom wall member, said combustion-chamber-defining wall being applicable to the block over said cylinder bore and a margin thereof exceeding the perimeter of said bore, so that said margin is not fire contacted, said margin being narrow and of small bulk relative to the dimensions of the balance of said inner wall, whereby to heat by conduction to substantially the temperature of the fire-contacted portion of said inner wall just inside said margin, said inner wall loosely fitting within said opening in said bottom head wall around its entire periphery, such as to afford capability for free radial thermal expansion therein, said combustion-chamber-defining wall member having intake and exhaust ports extending therethrough, and valve seats on said combustion-chamber-defining wall member around said valve ports.

5. A cylinder head for the cylindrically bored block of a liquid-cooled internal combustion engine, comprising: walls defining a hollow, liquid-cooled cylinder head, including a bottom wall structure applicable to the top of the block, said bottom wall structure including an inner, hot-running bottom wall member over the cylinder bore in the block and having a flame-contacted combustion-chamber-defining portion over said cylinder bore, and an outer, cooler-running bottom wall member outside and around said inner wall member, said inner and outer bottom members having opposed circumferential edges, said inner bottom wall member fitting loosely within said outer bottom wall member whereby to afford said inner bottom wall member with capability for radial thermal expansion within said outer bottom wall member, and slidingly over-lapped circumferential edge wall portions on the opposed circumferential edges of said inner and outer bottom wall members, said overlapped edge wall portions having opposed relatively slidable surfaces in a plane parallel to the top of the block.

6. The subject matter of claim 1, wherein the expansion joint comprises a frangible structure adapted to fracture upon thermal expansion of said inner bottom wall member relative to said outer bottom wall member.

7. The subject matter of claim 1, wherein said inner and outer bottom wall members are integral with one another and said expansion joint comprises a groove therebetween providing a readily elastically deformable wall section.

8. The subject matter of claim 1, wherein said expansion joint comprises a flexible wall member joining said inner and outer bottom wall members.

9. A cylinder head for the cylindrically bored block of a liquid-cooled internal combustion engine, comprising: walls defining a hollow, liquid-cooled cylinder head, including a bottom portion applicable to the top of said block, and having an opening therein circumscribing and exceeding the perimeter of the cylinder bore in the block, a combustion-chamber-defining flame-contacted wall within said opening applicable but unsecured to the top of the block over said cylinder bore, the outer periphery of said combustion-chamber-defining wall lying outside the circumferential limits of the cylinder bore but terminating shortly beyond the flame-contacted portion thereof so as to heat by thermal conduction to substantially the temperature of said flame-contacted portion and thereby thermally expand commensurately therewith whereby to avoid resistance to thermal expansion of said flame-contacted portion, said there being a thermal expansion gap between the entire outer periphery of said combustion-chamber-defining wall member and said bottom portion of said head.

10. A cylinder head for the cylindrically bored block of a liquid-cooled internal combustion engine, comprising: walls defining a hollow, liquid-cooled cylinder head, including a bottom portion applicable to the top of said block, and having an opening therein circumscribing and exceeding the perimeter of the cylinder bore in the block, a combustion-chamber-defining flame-contacted wall within said opening applicable but unsecured to the top of the block over said cylinder bore, the outer periphery of said combustion-chamber-defining wall lying outside the circumferential limits of the cylinder bore but terminating shortly beyond the flame-contacted portion thereof so as to heat by thermal conduction to substantially the temperature of said flame-contacted portion and thereby thermally expand commensurately therewith whereby to avoid resistance to thermal expansion of said flame-contacted portion, said combustion-chamber-defining wall having intake and exhaust ports therethrough, and valve seats on said last-mentioned wall around said valve ports.

11. A cylinder head for the cylindrically bored block of a liquid-cooled internal combustion engine, comprising: walls defining a hollow, liquid-cooled cylinder head, including a bottom portion applicable to the top of said block, and having an opening therein circumscribing and exceeding the perimeter of the cylinder bore in the block, an insert unit comprising a combustion-chamber-defining flame-contacted wall member positioned inside said opening and arranged for radial thermal expansion therein, said wall member being applicable to the top of the block over and entirely around and outside said cylinder bore, said wall member having intake and exhaust ports therethrough, valve seats on said wall member around said ports, individual port tubes formed integrally with said wall member around said valve ports and rising from said wall member, said individual port tubes being arranged for movement apart upon thermal radial expansion of said wall member, and a valve stem guide structure formed integrally with each of said port tubes above the corresponding valve seat and provided with a bore for a valve stem guide sleeve in axial alignment with said valve seat.

12. A cylinder head for the cylindrically bored block of a liquid-cooled internal combustion engine, comprising: walls defining a hollow, liquid-cooled cylinder head, including a bottom portion applicable to the top of said block, and having an opening therein circumscribing and exceeding the perimeter of the cylinder bore in the block, and an insert unit comprising a combustion-chamber-defining flame-contacted wall member positioned inside said opening and arranged for radial thermal expansion therein, said wall member being applicable to the top of the block over and entirely around and outside said cylinder bore, said wall member having intake and exhaust ports therethrough, valve seats on said wall member around said ports, individual port tubes formed integrally with said wall member around said valve ports and rising from said wall member, said individual port tubes being separate of and spaced from one another for a distance above said wall member whereby to accommodate relative separative movement therebetween upon radial expansion of said wall member, and a valve stem guide structure formed integrally with each of said port tubes above the corresponding valve seat and provided with a bore for a valve stem guide sleeve in axial alignment with said valve seat.

13. A cylinder head for the cylindrically bored block of a liquid-cooled internal combustion engine, comprising: a head casting having walls, including an upper wall, sides, and a bottom portion, defining the exterior or a hollow, liquid-cooled head, said bottom portion being applicable to the top of the block, and having an opening therein circumscribing and exceeding the perimeter of the cylinder bore in the block, and an insert unit comprising a combustion-chamber-defining flame-contacted wall member positioned inside said opening and arranged for radial thermal expansion therein, said wall member being applicable to the top of the block over and entirely around and outside said cylinder bore, said wall member having intake and exhaust ports therethrough, valve seats on said wall member around said ports, individual port tubes formed integrally with said wall member around said valve ports and rising from said wall member, said individual port tubes being arranged for movement apart upon thermal radial expansion of said wall member, a valve stem guide structure formed integrally with each of said port tubes spaced above the corresponding valve seat and provided with a bore for a valve stem guide sleeve in axial alignment with said valve seat, and top wall means integral with said valve stem guide structures and port tubes, and means on said upper wall of said head engageable with said top wall means of said insert unit.

14. The subject matter of claim 13, wherein said top wall means of said insert unit comprises a single unitary wall.

15. A cylinder head for the cylindrically bored block of a liquid-cooled internal combustion engine, comprising: a head casting having walls, including an upper wall, sides, and a bottom portion, defining the exterior of a hollow, liquid-cooled head, said bottom portion being applicable to the top of the block, and having an opening therein circumscribing and exceeding the perimeter of the cylinder bore in the block, and an insert unit comprising a combustion-chamber-defining flame-contacted wall member positioned inside said opening and arranged for radial thermal expansion therein, said wall member being applicable to the top of the block over and entirely around said cylinder bore, said wall member having intake and exhaust ports therethrough, valve seats on said wall member around said ports, individual port tubes formed integrally with said wall member around said valve ports and rising from said wall member, said individual port tubes being arranged for movement apart upon thermal radial expansion of said wall member, a valve stem guide structure formed integrally with each of said port tubes spaced above the corresponding valve seat and provided with a bore for a valve stem guide sleeve in axial alignment with said valve seat, and top wall means integral with said valve stem guide structures and port tubes, the underside of said upper wall of said head and said top wall means of said insert unit being vertically engageable and being arranged for relative movement in a horizontal plane.

16. The subject matter of claim 15, wherein said top wall means of said insert unit comprises a single unitary wall.

17. The subject matter of claim 16, wherein said top wall means of said insert unit comprises two individual relatively bodily movable wall members.

18. A cylinder head for the cylindrically bored block of a liquid-cooled internal combustion engine, comprising: a head casting having walls, including an upper wall, sides, and a bottom portion, defining the exterior of a hollow, liquid-cooled head, said bottom portion being applicable to the top of the block, and having an opening therein circumscribing and exceeding the perimeter of the cylinder bore in the block, and an insert unit comprising a combustion-chamber-defining flame-contacted wall member positioned inside said opening and arranged for radial thermal expansion therein, said wall member being applicable to the top of the block over and entirely around said cylinder bore, said wall member having intake and exhaust ports therethrough, valve seats on said wall member around said ports, individual port tubes formed integrally with said wall member around said valve ports and rising from said wall member, said individual port tubes being arranged for movement apart upon thermal radial expansion of said wall member, a valve stem guide structure formed integrally with each of said port tubes spaced above the corresponding valve seat and provided with a bore for a valve stem guide sleeve in axial alignment with said valve seat, top wall means integral with said valve stem guide structures and port tubes, and valve stem guide sleeves in said sleeve bores projecting above said top wall means and through said upper wall of said head, said upper wall of said head being apertured to pass said sleeves with clearance, whereby to accommodate lateral shifting of said insert unit relative to said head, and means packing said guide sleeves to said upper wall of said head and to said top wall means of said insert unit.

19. A cylinder head for the cylindrically bored block of a liquid-cooled internal combustion engine, comprising: walls defining a hollow, liquid-cooled cylinder head, including a bottom portion applicable to the top of said block, and having an opening therein circumscribing and exceeding the perimeter of the cylinder bore in the block, and an insert unit comprising a combustion-chamber-defining flame-contacted wall member positioned inside said opening and arranged for radial thermal expansion therein, said wall member being applicable to the top of the block over and entirely around said cylinder bore, said wall member having intake and exhaust ports therethrough, valve seats on said wall member around said ports, and individual port tubes formed integrally with said wall member around said valve ports, each of said port tubes having an extremity directed toward a wall of said head, and a corresponding port means on and through the latter head wall joined and sealed to its respective port tube.

20. The subject matter of claim 19, wherein said port means include port tube members extending inwardly into the head and abutting the extremities of the port tubes of the insert unit.

21. The subject matter of claim 19, wherein said port means include port tube members extending inwardly into the head and abutting the extremities of the port tubes of the insert unit, and means forcing at least one port tube of the insert unit into pressural engagement with the corresponding port tube member extending inwardly into the head.

22. The subject matter of claim 19, wherein at least one of said port means includes a longitudinally flexible bellows coupled to the extremity of the corresponding port tube member of the insert unit.

23. The subject matter of claim 19, wherein at least one of said port means includes a port tube member extending inwardly into the head, and wherein the extremity of the corresponding port tube of the insert unit telescopically receives and is pressure sealed to the inner extremity of said port tube member.

24. A cylinder head for the cylindrically bored block of a liquid-cooled internal combustion engine, comprising: walls defining a hollow, liquid-cooled cylinder head, including a bottom portion applicable to the top of said block, and having an opening therein circumscribing and exceeding the perimeter of the cylinder bore in the block, and an insert unit comprising a combustion-chamber-defining flame-contacted wall member positioned inside said opening and arranged for radial thermal expansion therein, said wall member being applicable to the top of the block over and entirely around said cylinder bore, said wall member having intake and exhaust ports therethrough, valve seats on said wall member around said ports, and individual port tubes formed integrally with said wall member around said valve ports, said port tubes being both directed toward a common wall of said head, and port means on and through the latter wall including a pair of port tube members extending into the head from said latter wall into abutment with the port tubes of the insert unit, and means coupling corresponding ends of the abutting port tube members.

25. A cylinder head for the cylindrically bored block of a liquid-cooled internal combustion engine, comprising: walls defining a hollow, liquid-cooled cylinder head, including a bottom portion applicable to the top of said block, and having an opening therein circumscribing and exceeding the perimeter of the cylinder bore in the block, and an insert unit comprising a combustion-chamber-defining flame-contacted wall member positioned inside said opening and arranged for radial thermal expansion therein, said wall member being applicable to the top of the block over and entirely around said cylinder bore, said wall member having intake and exhaust ports therethrough, valve seats on said wall member around said ports, and individual port tubes formed integrally with said wall member around said valve ports, said port tubes being both directed toward a common wall of said head, and port means on and through the latter wall including a pair of port tube members extending into the head from said latter wall into abutment with the port tubes of the insert unit, and compression means acting between the cylinder head and insert unit for forcing the port tube members of the insert unit into pressural engagement with the port tube members extending into the head.

26. The subject matter of claim 19, wherein said port means include ports in said head wall, and port tube members packed in said ports, extending inwardly into said head, and received in said port tubes of said insert unit.

27. A cylinder head for the cylindrically bored block of a liquid-cooled internal combustion engine, comprising: a head casting having walls, including an upper wall, sides, and a bottom portion, defining the exterior of a hollow, liquid-cooled head, said bottom portion being applicable to the top of the block, and having an opening therein circumscribing and exceeding the perimeter of the cylinder bore in the block, and an insert unit comprising a combustion-chamber-defining flame-contacted wall member positioned inside said opening and arranged for radial thermal expansion therein, said wall member being applicable to the top of the block over and entirely around said cylinder bore, said upper wall of said head having an opening therethrough, a precombustion chamber and fuel injection housing barrel receivable with clearance through said opening, said combustion-chamber-defining wall member of said insert unit having an orifice therethrough aligned with said opening in said upper head wall and adapted to receive and mount the inner extremity of said barrel, all in such manner that the clearance between said opening in said upper head wall and said barrel accommodates small lateral shifting of said barrel with radial thermal expansion of said combustion-chamber-defining wall member, and packing means sealing said opening in said upper head wall unit to said barrel.

28. A cylinder head for the cylindrically bored block of a liquid-cooled internal combustion engine, comprising: a head casting having walls, including an upper wall, sides, and a bottom portion, defining the exterior of a hollow, liquid-cooled head, said bottom portion being applicable to the top of the block, and having an opening therein circumscribing and exceeding the perimeter of the cylinder bore in the block, and an insert unit comprising a combustion-chamber-defining flame-contacted wall member positioned inside said opening and arranged for radial thermal expansion therein, said wall member being applicable to the top of the block over and entirely around said cylinder bore, said wall member having intake and exhaust ports therethrough, valve seats on said wall member around said ports, port tube and valve guide structure rising from said wall member inwardly of the periphery of the latter and including individual port tubes, and support means for valve stem guide sleeves located over said valve seats, means on said head having a horizontal downwardly facing supporting surface, an upwardly facing horizontal surface on said insert unit slidably engaged by said downwardly facing supporting surface, and means laterally rigidly connecting said head casting to said port tube and valve guide structure for lateral support of the insert unit at a location substantially inward of the vertically projected margin of said combustion-chamber-defining wall member.

29. In combustion, a cylinder head casting having top, side and bottom wall portions, there being an aperture through said bottom wall portion encompassing a combustion chamber area thereof, an insert wall member mechanically fitted, with freedom for thermal expansion, in said aperture, means on said wall member by which said member is supported from said top wall of said head casting, a port tube integrally joined at one end to said wall member and ported therethrough, said side walls of said casting having an opening on at least one side thereof, and a wall closure for said opening joined to said port tube and ported for communication with said port tube.

30. A liquid-cooled cylinder head for an internal combustion engine block having a cylinder bore, that includes: a two-part wall structure applicable to said block and comprising an inner combustion chamber wall over and marginally exceeding said bore all around, the outer surface of said inner wall being liquid cooled, and the opposite face thereof being fire contacted within the confines of said bore, said inner wall being unsecured to said block and being thermally radially expansive independently of the block, and an outer liquid-cooled wall around the periphery of said inner wall, said outer wall having an aperture therethrough receiving said inner wall, with clearance all around, so as to accommodate free thermal radial expansion of said inner wall relative to said outer wall and thereby relieve compressive stress in said inner wall in all lateral directions, the marginal, non-fire-contacted portion of said inner wall outside said bore being limited in structural bulk and extension relative to the balance of said wall to an extent such that it heats substantially to the temperature of the adjacent fire-contacted portion of said wall, and thereby thermally expands commensurately therewith.

References Cited in the file of this patent

UNITED STATES PATENTS

| 1,156,312 | Regenbogen et al. | Oct. 12, 1915 |
| 1,159,832 | Darber et al. | Nov. 9, 1915 |
| 1,376,620 | Hildebrand | May 3, 1921 |
| 2,250,376 | Hemmingsen | July 22, 1941 |

FOREIGN PATENTS

| 31,896 | Netherlands | Dec. 16, 1933 |
| 801,487 | France | May 23, 1936 |
| 853,841 | Germany | Oct. 27, 1952 |